United States Patent
Osborne et al.

(10) Patent No.: US 11,449,254 B1
(45) Date of Patent: Sep. 20, 2022

(54) MANAGED BULK MEMORY

(71) Applicant: Graphcore Limited, Bristol (GB)

(72) Inventors: Richard Osborne, Bristol (GB); Chad Jarvis, Oslo (NO); Fabian Tschopp, Oslo (NO); Tim Hutt, Bristol (GB); Emmanuel Menage, Oslo (NO)

(73) Assignee: GRAPHCORE LIMITED, Bristol (GB)

( * ) Notice: Subject to any disclaimer, the term of this patent is extended or adjusted under 35 U.S.C. 154(b) by 58 days.

(21) Appl. No.: 17/024,357

(22) Filed: Sep. 17, 2020

(51) Int. Cl.
*G06F 3/06* (2006.01)
*G06F 8/41* (2018.01)
*G06N 3/04* (2006.01)

(52) U.S. Cl.
CPC .......... *G06F 3/0644* (2013.01); *G06F 3/0604* (2013.01); *G06F 3/0647* (2013.01); *G06F 3/0673* (2013.01); *G06F 8/41* (2013.01); *G06N 3/04* (2013.01)

(58) Field of Classification Search
CPC .... G06F 3/0673; G06F 3/0647; G06F 3/0604; G06F 3/0644
See application file for complete search history.

(56) References Cited

U.S. PATENT DOCUMENTS

2018/0341483 A1* 11/2018 Fowers ............... G06F 9/30192
2021/0373895 A1* 12/2021 Shahim ................ G06F 3/0655

* cited by examiner

*Primary Examiner* — Edward J Dudek, Jr.
(74) *Attorney, Agent, or Firm* — Haynes and Boone, LLP

(57) ABSTRACT

A system and method for providing a set of data transfer instructions for converting one or more tensors between two different layouts. A first layout is used for storage of the data in host memory. A second layout is used for storage of the data in external memory accessible to a subsystem. The subsystem acts as a work accelerator to the host, and reads the external memory and processes the data read from the external memory. The first layout may be a logical representation of the tensor. The second layout is optimised for transfer to and processing by the subsystem. The data transfer instructions for converting between the two layouts are generated in dependence upon an analysis of the instructions to be executed by the subsystem.

29 Claims, 15 Drawing Sheets

MANAGED BULK MEMORY

TECHNICAL FIELD

The present disclosure relates to providing data to a subsystem for acting as a work accelerator for a host system.

BACKGROUND

In the context of processing data for complex or high volume applications, a work accelerator may be a subsystem to which processing of certain data is offloaded from a host system. Such a work accelerator may have specialised hardware for performing specific types of processing.

As an example, one area of computing in which such a specialised accelerator subsystem may be of use is found in machine intelligence. As will be familiar to those skilled in the art of machine intelligence, a machine intelligence algorithm is based around performing iterative updates to a "knowledge model", which can be represented by a graph of multiple interconnected nodes. The implementation of each node involves the processing of data, and the interconnections of the graph correspond to data to be exchanged between the nodes. Typically, at least some of the processing of each node can be carried out independently of some or all others of the nodes in the graph, and therefore large graphs expose great opportunities for multi-threading. Therefore, a work accelerator specialised for machine intelligence applications may comprise a large degree of multi-threading. One form of parallelism can be achieved by means of a processor comprising an arrangement of multiple tiles on the same chip (i.e. same die), each tile comprising its own separate respective processing unit and memory (including program memory and data memory). Thus separate portions of program code can be run in parallel on different ones of the tiles. The tiles are connected together via an on-chip interconnect which enables data to be exchanged between them. Such an accelerator may function as a subsystem for a host system to perform parallel processing of data sets provided to it.

During operation of an accelerator subsystem, workloads of data are provided to the accelerator subsystem. The accelerator subsystem processes these workloads before returning results of the processing. Included in such workloads may be tensors of data on which operations are performed. Such tensors, e.g. matrices, are frequently employed in machine learning applications when performing convolution operations for use in convolutional neural networks, which are most commonly used for performing image processing. Another type of operation performed on tensors in machine learning applications is a reduction operation in which elements along one or more dimensions of the tensor are summed. In the context of machine learning, such reduction operations may be performed as part of data parallel training, whereby a plurality of gradients or updated weights derived by different nodes are reduced for the purposes of providing an average of the training results across the multi-node system.

SUMMARY

An accelerator subsystem may be configured to execute certain operations on tensors of data that are read by the subsystem from external memory. However, if the elements of tensors of data received at the subsystem from the external memory are not suitably arranged, delays may occur in the processing of the tensors. Such delays may occur, for example, when a group of elements of a tensor that are to be reduced together are not arranged contiguously to one another. In this case, a processor of the subsystem may be required to execute further instructions to move elements of a tensor to different locations.

According to a first aspect, there is provided a data processing system comprising at least one processor and at least one memory storing computer readable instructions, wherein the at least one processor is configured to execute the computer readable instructions to: determine, in dependence upon at least one operation specified by one or more instructions for a program, at least one indication of an arrangement of elements for at least one tensor of data, the one or more instructions specifying the at least one operation as being performed with respect to the at least one tensor, the program being for execution on a subsystem for acting as work accelerator to a host system; generate in dependence upon the at least one indication of the arrangement of elements for the at least one tensor of data, a set of data transfer instructions for re-arranging data for storage in an external memory accessible to the subsystem, wherein the data transfer instructions are configured to, when executed on at least one processor of the host system: cause data to be read from a memory of the host system, said data including the at least one tensor; and cause the elements of the at least one tensor read from the memory of the host system to be stored in the external memory in a modified layout dependent upon the at least one indication of the arrangement of elements, wherein the program is configured to, when executed by at least one processor of the subsystem, cause a read request to be issued to the external memory to read the elements of the at least one tensor in the modified layout from the external memory.

By determining the layout for a tensor of data based on operations to be performed by the subsystem with respect to that tensor, the tensor may be stored in external memory and supplied to the subsystem in a layout that optimises transfer and processing efficiency. A user supplying data for processing by the subsystem does not need to provide the data in an optimised layout, but is able to rely upon the conversion process performed by the data transfer instructions.

In some embodiments, the at least one indication of an arrangement of elements for the at least one tensor of data comprises: an indication of a layout for the at least one tensor when stored in the memory of the host system; and an indication of the modified layout.

In some embodiments, the at least one operation comprises a plurality of operations, wherein each of the plurality of operations are specified in the one or more instructions to be performed with respect to a different subset of elements of the at least one tensor, wherein the modified layout is such that, for each of the subsets of elements, the elements of the respective subset are arranged contiguously in the external memory.

In some embodiments, each of at least some of the plurality of operations comprises a reduction operation, wherein the modified layout is such that elements of the at least one tensor to be reduced together are arranged contiguously to one another in the external memory.

In some embodiments, the subsystem comprises a processing unit comprising a plurality of processors, wherein each of at least some of the plurality of operations comprises a different one of the processors reading a different one of the subsets of elements from the external memory, wherein the modified layout is such that elements of the at least one tensor to be delivered to a same one of the processors are arranged contiguously to one another in the external memory.

In some embodiments, the external memory comprises a plurality of buffers, wherein the at least one operation specified by the one or more instructions comprises reading the elements of the at least one tensor in the modified layout from one of the plurality of buffers specified by the one or more instructions, wherein the determining the indication of the arrangement of elements comprises determining the arrangement of elements in dependence upon which of the plurality of buffers the elements of the at least one tensor is to be read from as specified by the one or more instructions.

In some embodiments, the external memory is part of the host system.

In some embodiments, the at least one operation comprises: generating from the elements of the at least one tensor, at least one result tensor; and causing the at least one result tensor to be stored in the external memory according to a layout used for storing the at least one result tensor in the subsystem memory.

According to a second aspect, there is provided a data processing system comprising at least one processor and at least one memory storing computer readable instructions, wherein the at least one processor is configured to execute the computer readable instructions to: determine in dependence upon at least one operation specified by one or more instructions for a program, at least one indication of an arrangement of elements for at least one tensor of data, the one or more instructions specifying the at least one operation as being performed with respect to the at least one tensor, the program being for execution on a subsystem for acting as a work accelerator to a host system; generate in dependence upon the at least one indication of the arrangement of elements for the at least one tensor of data, a set of data transfer instructions for re-arranging data for storage in memory of the host system in a modified layout, wherein the program is configured to, when executed by at least one processor of the subsystem, cause at least one write request to be issued to the external memory to write to the external memory, data including the at least one tensor, wherein the data transfer instructions are configured to, when executed on at least one processor of the host system: cause the data including the at least one tensor to be read from the external memory; and cause the elements of the at least one tensor read from the external memory to be stored in the memory of the host system in the modified layout.

By determining the layout for a tensor of data based on operations to be performed by the subsystem to generate a tensor, the subsystem may output the tensor to external memory a layout that optimises for transfer efficiency between the external memory and the subsystem. The tensor data output by the subsystem may then be re-arranged for storing in the host. Therefore, the user may access the data in a format—e.g. a logical representation—that is different to the layout optimised for processing and transfer by the subsystem.

In some embodiments, the at least one indication of an arrangement of elements for the at least one tensor of data comprises: an indication of a layout for the at least one tensor when stored in the external memory; and an indication of the modified layout.

In some embodiments, wherein the at least one operation comprises a plurality of operations, wherein each of the plurality of operations are specified in the one or more instructions to be performed with respect to a different subset of elements of the at least one tensor, wherein the writing to the external memory comprises for each of the subsets of elements, writing the respective subset such that the elements of the respective subset are arranged contiguously in the external memory.

In some embodiments, each of at least some of the plurality of operations comprises receiving the respective subset of elements of the at least one tensor from a different one of a plurality of further subsystems.

In some embodiments, the subsystem comprises a processing unit comprising a plurality of processors, wherein the at least one write request comprises a plurality of write requests, wherein each of at least some of the plurality of operations comprises a different one of the processors issuing one or more of the write requests to write one of the subsets of elements to the external memory.

In some embodiments, the at least one operation specified by the one or more instructions comprises one or more collective operations for generating the elements of the at least one tensor, wherein each of the elements is associated with a weight of a neural network, wherein the generating the data transfer instructions comprises determining the modified layout such that one of the weights for determining an activation for a same node of the neural network are arranged contiguously to one another in the memory of the host system.

In some embodiments, the external memory comprises a plurality of buffers, wherein the at least one operation specified by the one or more instructions comprises dispatching the at least one write request to write to the one of the plurality of buffers, data including at least one tensor, wherein the data transfer instructions are configured to, when executed on at least one processor of the host system, cause the data including the at least one tensor to be read from the one of the plurality of buffers, wherein the generating the data transfer instructions comprises determining the modified layout in dependence upon which of the plurality of buffers, the at least one tensor is written to and read from.

In some embodiments, the at least one processor is configured to execute the computer readable instructions to: compile the program using the one or more instructions for the program, the compilation comprising: providing the compiled program with at least one instruction which, when executed by at least one processor of the subsystem, causes the subsystem to write the data of the at least one tensor to the external memory in the layout for the at least one tensor when stored in the external memory.

In some embodiments, the layout for the at least one tensor when stored in the external memory corresponds to a layout for the at least one tensor when stored in at least one memory of the subsystem.

According to a third aspect, there is provided a method for providing a set of data transfer instructions, the method comprising: determining, in dependence upon at least one operation specified by one or more instructions for a program, at least one indication of an arrangement of elements for at least one tensor of data, the one or more instructions specifying the at least one operation as being performed with respect to the at least one tensor, the program being for execution on a subsystem for acting as work accelerator to a host system; and generating in dependence upon the at least one indication of the arrangement of elements for the at least one tensor of data, a set of data transfer instructions for re-arranging data for storage in an external memory accessible to the subsystem, wherein the data transfer instructions are configured to, when executed on at least one processor of the host system: cause data to be read from a memory of the host system, said data including the at least one tensor; and cause the elements of the at least one tensor read from the memory of the host system to be stored in the external memory in a modified layout dependent upon the at least one indication of the arrangement of elements, wherein the program is configured to, when executed by at least one processor of the subsystem, cause a read request to be issued to the external memory to read the elements of the at least one tensor in the modified layout from the external memory.

According to a fourth aspect, there is provided a method for providing a set of data transfer instructions, the method comprising: determining in dependence upon a at least one operation specified by one or more instructions for a program, at least one indication of an arrangement of elements for at least one tensor of data, the one or more instructions specifying the at least one operation as being performed with respect to the at least one tensor, the program being for execution on a subsystem for acting as a work accelerator to a host system; and generating in dependence upon the at least one indication of the arrangement of elements for the at least one tensor of data, the set of data transfer instructions for re-arranging data for storage in memory of the host system in a modified layout, wherein the program is configured to, when executed by at least one processor of the subsystem, cause at least one write request to be issued to the external memory to write to the external memory, data including the at least one tensor, wherein the data transfer instructions are configured to, when executed on at least one processor of the host system: cause the data including the at least one tensor to be read from the external memory; and cause the at least one tensor read from the external memory to be stored in the memory of the host system in the modified layout.

According to a fifth aspect, there is provided a non-transitory computer readable storage medium storing instructions which, when executed by at least one processor, cause a method to be carried out, the method comprising: determining, in dependence upon at least one operation specified by one or more instructions for a program, at least one indication of an arrangement of elements for at least one tensor of data, the one or more instructions specifying the at least one operation as being performed with respect to the at least one tensor, the program being for execution on a subsystem for acting as work accelerator to a host system; generating in dependence upon the at least one indication of the arrangement of elements for the at least one tensor of data, a set of data transfer instructions for re-arranging data for storage in an external memory accessible to the subsystem, wherein the data transfer instructions are configured to, when executed on at least one processor of the host system: cause data to be read from a memory of the host system, said data including the at least one tensor; and cause the elements of the at least one tensor read from the memory of the host system to be stored in the external memory in a modified layout dependent upon the at least one indication of the arrangement of elements, wherein the program is configured to, when executed by at least one processor of the subsystem, cause a read request to be issued to the external memory to read the elements of the at least one tensor in the modified layout from the external memory.

According to a sixth, there is provided to non-transitory computer readable storage medium storing instructions which, when executed by at least one processor, cause a method to be carried out, the method comprising: determining in dependence upon a at least one operation specified by one or more instructions for a program, at least one indication of an arrangement of elements for at least one tensor of data, the one or more instructions specifying the at least one operation as being performed with respect to the at least one tensor, the program being for execution on a subsystem for acting as a work accelerator to a host system; and generating in dependence upon the at least one indication of the arrangement of elements for the at least one tensor of data, the set of data transfer instructions for re-arranging data for storage in memory of the host system in a modified layout, wherein the program is configured to, when executed by at least one processor of the subsystem, cause at least one write request to be issued to the external memory to write to the external memory, data including the at least one tensor, wherein the data transfer instructions are configured to, when executed on at least one processor of the host system: cause the data including the at least one tensor to be read from the external memory; and cause the at least one tensor read from the external memory to be stored in the memory of the host system in the modified layout.

BRIEF DESCRIPTION OF DRAWINGS

For a better understanding of the present disclosure and to show how the same may be carried into effect, reference will now be made by way of example to the accompanying Figures in which.

DETAILED DESCRIPTION

This application relates to a data processing system for producing conversion instructions to correctly arrange data in an external memory for transfer to and from an accelerator subsystem. In embodiments, the accelerator subsystem is a processing unit. The processing unit may be a processing unit having a plurality of processors, referred to herein as tiles. An example of such a processing unit is first described.

Figure 1:
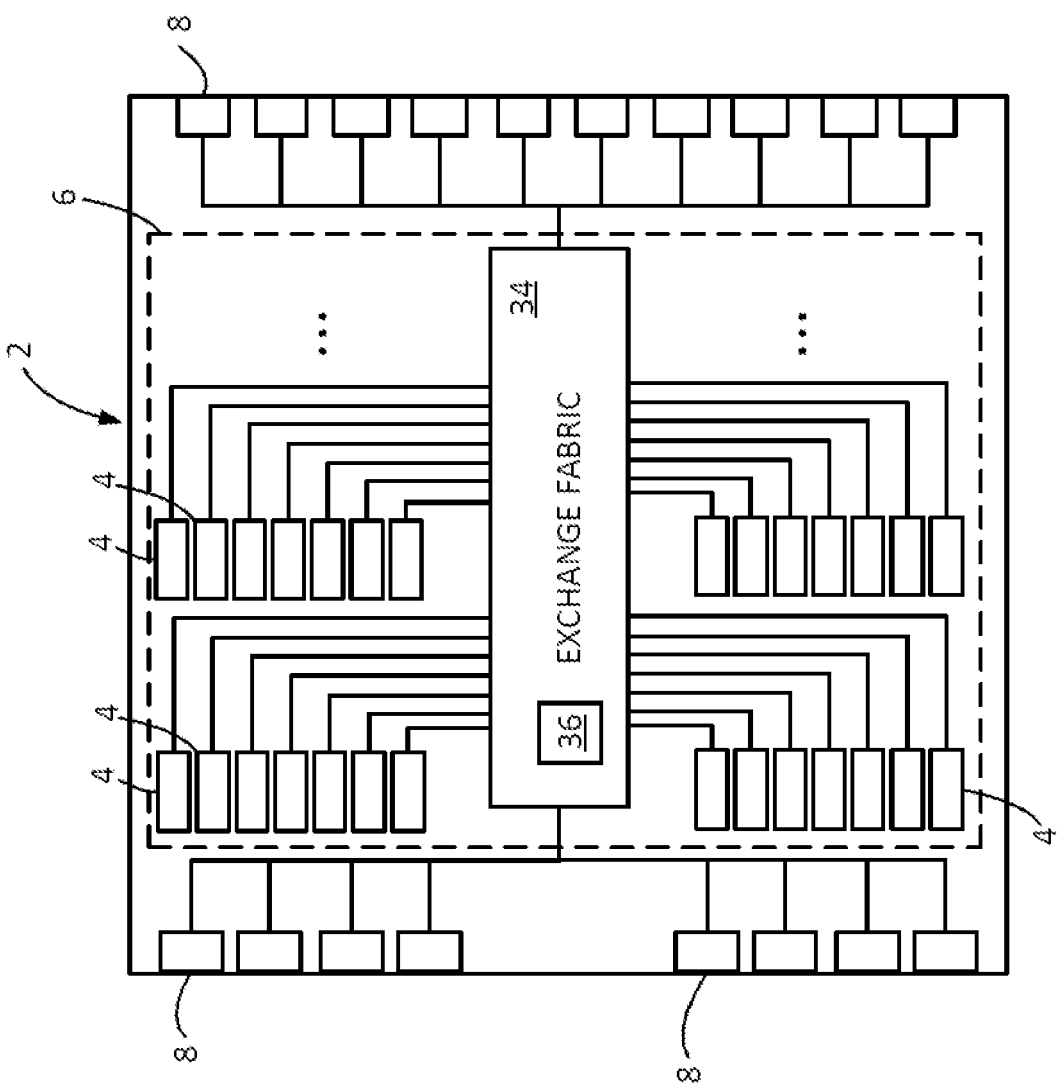
FIG. 1 is a schematic block diagram of a processor chip comprising multiple tiles.

Reference is made to FIG. 1, which illustrates an example processing unit 2. This example processing unit 2 is a multi-tile processing unit 2. The processing unit 2 may be an Intelligence Processing Unit (IPU) that is described in our earlier U.S. application Ser. No. 16/538,980, the contents of which are incorporated by reference. Each of the IPUs is formed on a separate integrated circuit (i.e. a separate chip).

The processing unit 2 comprises an array 6 of multiple processor tiles 4 and an interconnect 34 connecting between the tiles 4. The processing unit 2 may be implemented alone as one of multiple dies packaged in the same IC package. The interconnect 34 may also be referred to herein as the "exchange fabric" 34 as it enables the tiles 4 to exchange data with one another. Each tile 4 comprises a respective instance of an execution unit and memory. For instance, by way of illustration, the processing unit 2 may comprise of the order of hundreds of tiles 4, or even over a thousand. For completeness, note also that an "array" as referred to herein does not necessarily imply any particular number of dimensions or physical layout of the tiles 4.

In embodiments, each processing unit 2 also comprises one or more external links 8, enabling the processing unit 2 to be connected to one or more other processing units (e.g. one or more other instances of the same processing unit 2). These external links 8 may comprise any one or more of: one or more processing unit-to-host links for connecting the processing unit 2 to a host system, and/or one or more processing unit-to-processing unit links for connecting together with one or more other instances of the processing unit 2 on the same IC package or card, or on different cards. The processing unit 2 receives work from the host, in the form of application data which it processes.

The interconnect 34 is configured to enable the different tiles 4 in the array 6 to communicate with one another. However, as well as there potentially being dependencies between threads on the same tile 4, there may also exist dependencies between the portions of the program running on different tiles 4 in the array 6. A technique is therefore required to prevent a piece of code on one tile 4 running ahead of data upon which it is dependent being made available by another piece of code on another tile 4. This is achieved using a data consistency model.

Parallel programming models for AI and Data Science usually follows a 3-phase iterative execution model: Compute, Barrier, and Exchange. The implications are that data transfer to and from a processor is usually barrier dependent to provide data-consistency between the processors and between each processor and an external storage. Typically used data consistency models are Bulk Synchronous Parallel (BSP), Stale Synchronous Parallel (SSP) and Asynchronous. The processing unit 2 described herein uses a BSP model, but it will be apparent that the other sync models could be utilised as an alternative.

Figure 2:
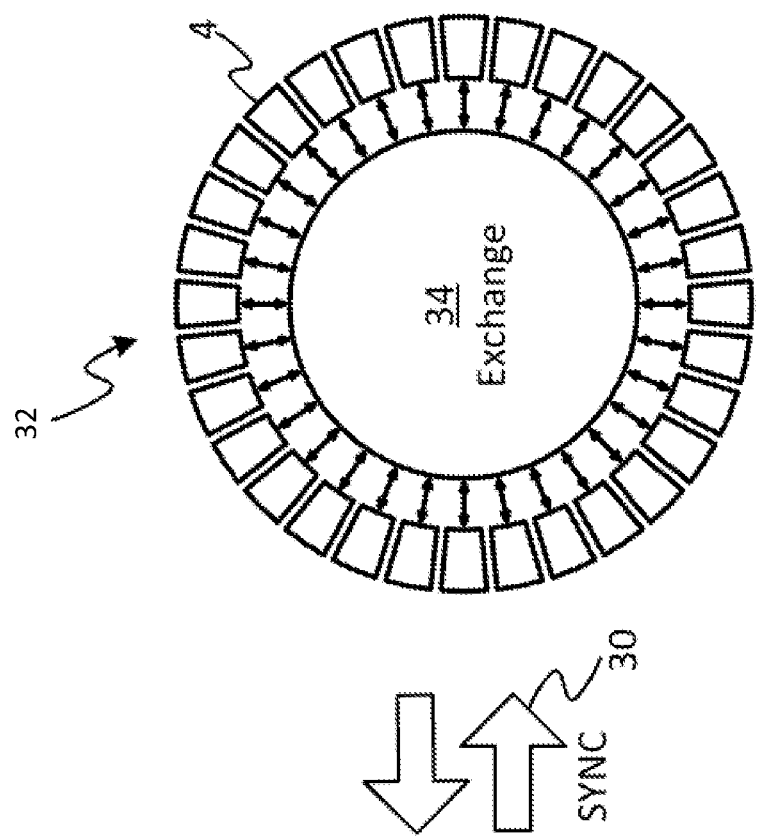
FIG. 2 is a schematic illustration of a bulk synchronous parallel (BSP) computing model.
Figure 2:
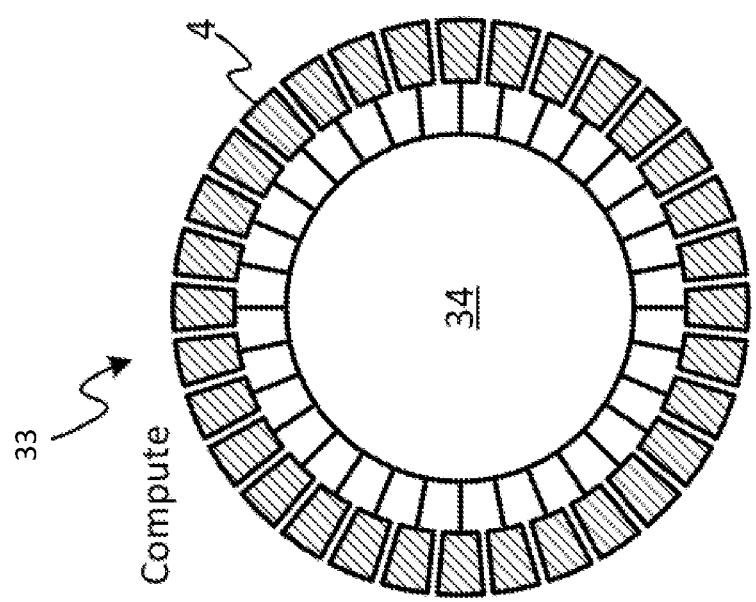
Figure 3:
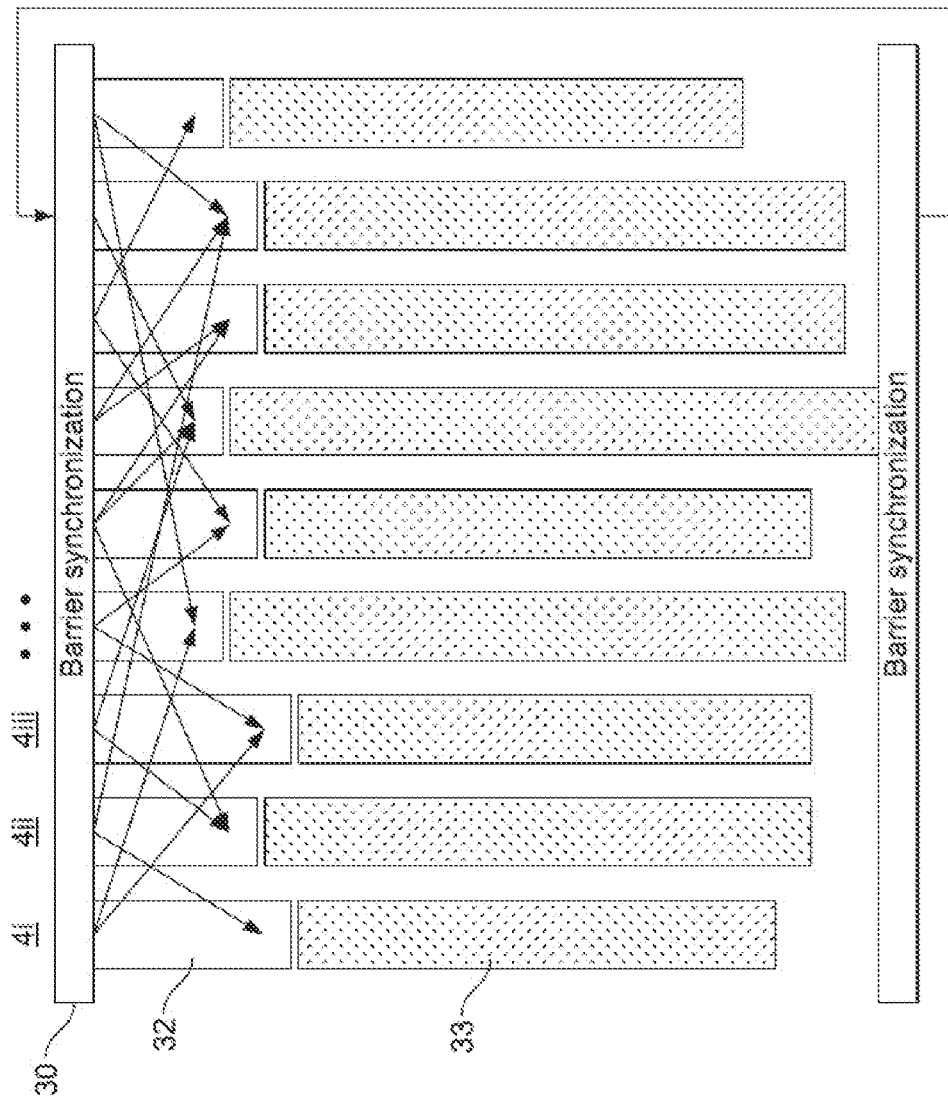
FIG. 3 is another schematic illustration of a BSP model.

Reference is made to FIGS. 2 and 3, which illustrate an implementation of a BSP exchange scheme in which each tile 4 performs a compute phase 33 and an exchange phase 32 in an alternating cycle, separated from one to the other by a barrier synchronization 30 between tiles. In the case illustrated by FIGS. 2 and 3, a barrier synchronization is placed between each compute phase 33 and the following exchange phase 32. During the compute phase 33, each tile 4 performs one or more computation tasks locally on-tile, but does not communicate any results of these computations with any others of the tiles 4. In the exchange phase 32, each tile 4 is allowed to exchange one or more results of the computations from the preceding compute phase to and/or from one or more others of the tiles 4, but does not perform any new computations until it has received from other tiles 4 any data on which its task(s) has/have dependency. Neither does it send to any other tile 4, any data except that computed in the preceding compute phase. It is not excluded that other operations such as internal control-related operations may be performed in the exchange phase 32. The communication external to the tile group may optionally utilise the BSP mechanism, but alternatively may not utilize BSP and may instead use some other synchronization mechanism of its own.

According to the BSP principle, a barrier synchronization 30 is placed at the juncture transitioning from the compute phase 33 into the exchange phase 32, or the juncture transitioning from the exchange phase 32 into the compute phase 33, or both. That is to say, either: (a) all tiles 4 are required to complete their respective compute phases 33 before any in the group is allowed to proceed to the next exchange phase 32, or (b) all tiles 4 in the group are required to complete their respective exchange phases 32 before any tile in the group is allowed to proceed to the next compute phase 33, or (c) both of these conditions are enforced. In all three variants, it is the individual tiles which alternate between phases, and the whole assembly which synchronizes. The sequence of exchange and compute phases may then repeat over multiple repetitions. In BSP terminology, each repetition of exchange phase and compute phase is sometimes referred to as a "superstep" (though note that in the literature the terminology is not always used consistently: sometimes each individual exchange phase and compute phase individually is called a superstep, whereas elsewhere, as in the terminology adopted herein, the exchange and compute phases together are referred to as a superstep).

Note also, it is not excluded that multiple different independent groups of tiles 4 on the same processing unit 2 or different processing units could each form a separate respective BSP group operating asynchronously with respect to one another, with the BSP cycle of compute, synchronize and exchange being imposed only within each given group, but each group doing so independently of the other groups. I.e. a multi-tile array 6 might include multiple internally synchronous groups each operating independently and asynchronously to the other such groups (discussed in more detail later). In some embodiments there is a hierarchical grouping of sync and exchange, as will be discussed in more detail later.

FIG. 3 illustrates the BSP principle as implemented amongst a group 4i, 4ii, 4iii of some or all of the tiles in the array 6, in the case which imposes: (a) a barrier synchronization from compute phase 33 to exchange phase 32 (see above). Note that, in this arrangement, some tiles 4 are allowed to begin computing 33 whilst some others are still exchanging.

The BSP model is used for exchange of data between tiles 4 on the processing unit 2. The communication between tiles 4 of a processing unit 2 occurs in time deterministic fashion in which data packets are transmitted without headers as in our earlier application U.S. patent application Ser. No. 16/538,980. Additionally, the BSP model may also be used for the exchange of data between processing units 2.

In embodiments, multiple instances of the processing unit 2 can be connected together to form an even larger array of tiles 4 spanning multiple processing unit 2. The processing units 2 connected together in this way may participate in barrier synchronisations with one another to exchange data with one another. Barrier synchronisations that take place only between tiles 4 on a single processing unit 2 are referred to as internal (on-chip) synchronisations. On the other hand, barrier synchronisations that take place between processing units 2 are referred to as external (inter-chip) synchronisations.

Figure 4:
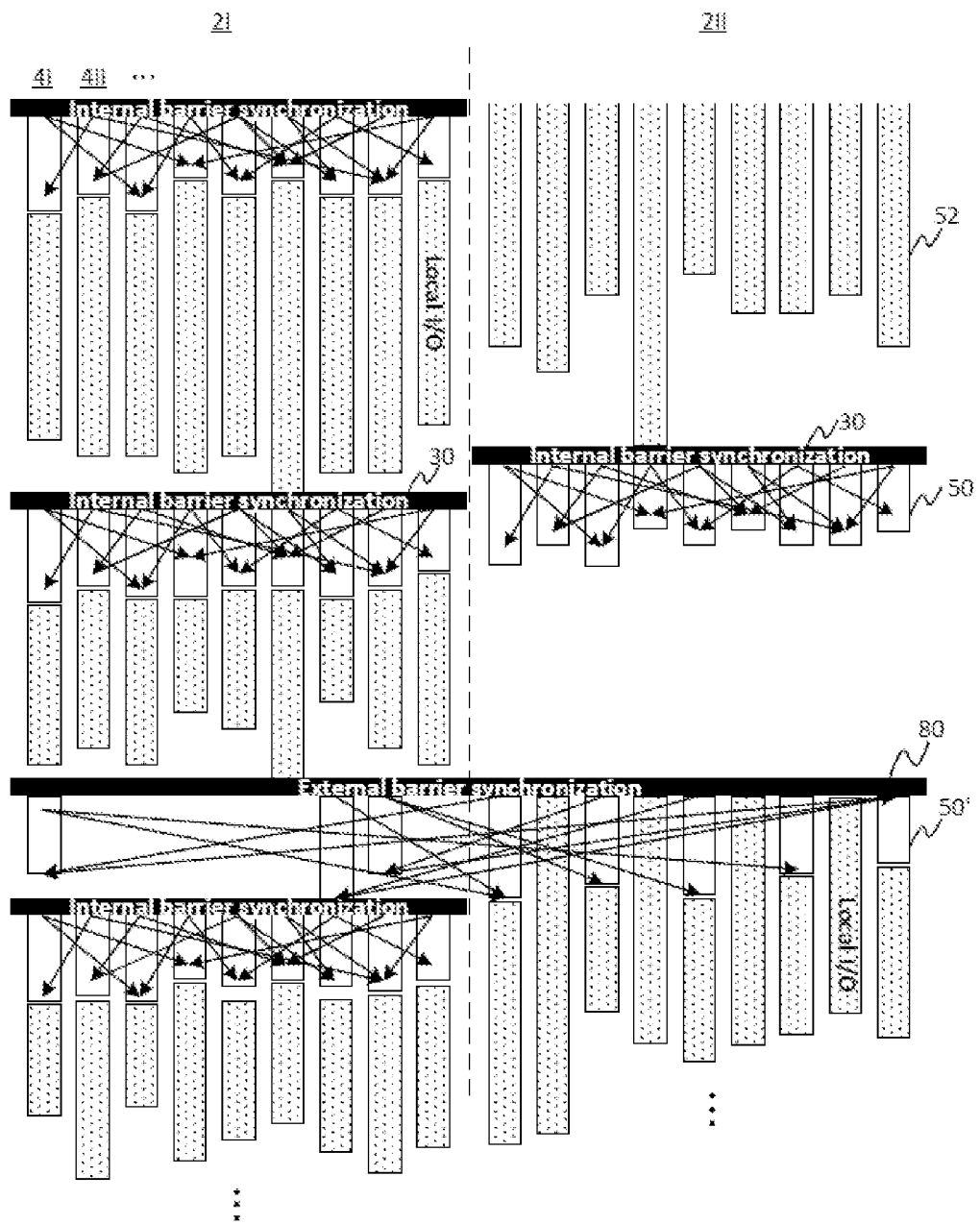
FIG. 4 is a schematic illustration of a multi-tier BSP scheme.

Reference is made to FIG. 4, which illustrates an example BSP program flow involving both internal and external synchronizations. As shown, the flow comprises internal exchanges 50 (of data between tiles 4 on the same chip 2) and an external exchange 50' (of data between tiles 4 on different chips 2). The program flow in FIG. 4 illustrates a program flow for a first processing unit 2i and a second processing unit 2ii.

As illustrated in FIG. 4, the internal BSP supersteps (comprising the internal exchanges 50 of data between tiles 4 on the same chip 2) are kept separate from the external sync and exchange (comprising the external exchanges 50' of data between tiles 4 on different chips 2).

The program may be arranged to perform a sequence of synchronizations, exchange phases and compute phases comprising, in the following order: (i) a first compute phase, then (ii) an internal barrier synchronization 30, then (iii) an internal exchange phase 50, then (iv) an external barrier synchronization 80, then (v) an external exchange phase 50'. The external barrier 80 is imposed after the internal exchange phase 50, such that the program only proceeds to the external exchange 50' after the internal exchange 50. Note also that, as shown with respect to chip 21 in FIG. 4, optionally a compute phase may be included between internal exchange (iii) and external barrier (iv).

This overall sequence is enforced by the program (e.g. being generated as such by the compiler). In embodiments, the program is programmed to act in this way by means of a SYNC instruction executed by the tiles 4. The internal synchronization and exchange does not extend to any tiles or other entities on another chip 2. The sequence (i)-(v) (with the aforementioned optional compute phase between iii and iv) may be repeated in a series of overall iterations. Per iteration there may be multiple instances of the internal compute, sync and exchange (i)-(iii) prior to the external sync & exchange. I.e. multiple instances of (i)-(iii) (retaining that order), i.e. multiple internal BSP supersteps, may be implemented before (iv)-(v), i.e. the external sync and exchange. Note also, any of the tiles 4 may each be performing their own instance of the internal synchronization and exchange (ii)-(iii) in parallel with the other tiles 4.

Thus per overall BSP cycle (i)-(v) there is at least one part of the cycle (ii)-(iii) wherein synchronization is constrained to being performed only internally, i.e. only on-chip.

Note that during an external exchange 50 the communications are not limited to being only external: some tiles may just perform internal exchanges, some may only perform external exchanges, and some may perform a mix.

Also, as shown in FIG. 4, some tiles 4 may perform local input/output during a compute phase. For example, they may exchange data with a host or other type of external storage.

Note also that, as shown in FIG. 4, it is in general possible for any or all tiles to have a null compute phase 52 or a null exchange phase 50 in any given BSP superstep.

Different sync groups can be defined for the exchange of data at each external barrier synchronisations. These sync groups are programmed into the local programs that execute on the processing units. The tiles 4 execute sync instructions when they reach the barrier synchronisation. The sync instruction takes the sync group as an operand and controls between which processing units 2 each sync occurs.

Figure 5:
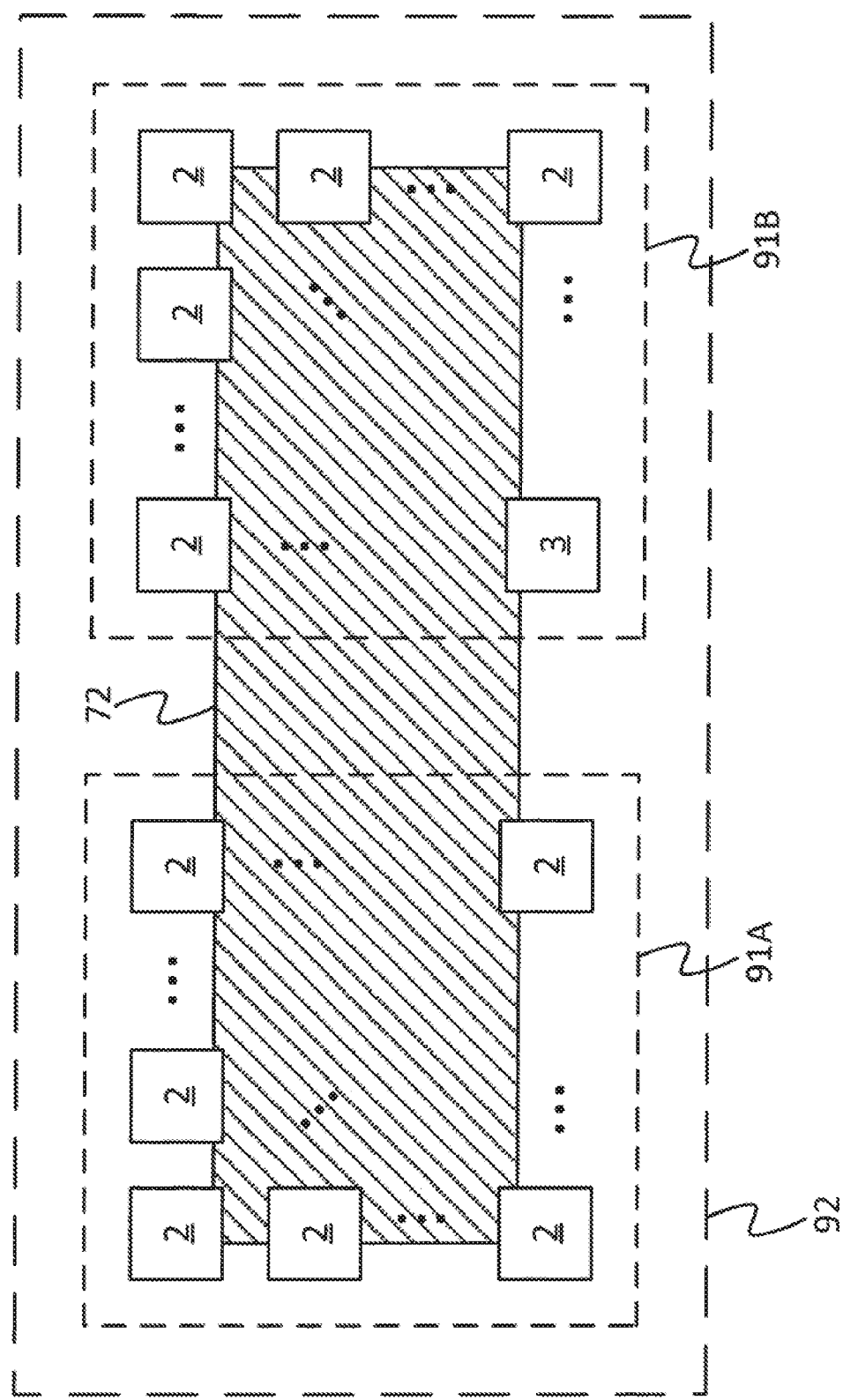
FIG. 5 is another schematic illustration of different synchronisation groups.

Reference is made to FIG. 5, which illustrates multiple different possible external sync groups, e.g. group_1 or group_2. In embodiments these correspond to different hierarchical levels. That is to say, each higher hierarchical level 92 (e.g. group 2) encompasses two or more groups 91A, 91B of at least one lower hierarchical level. In embodiments, there are just two hierarchical levels, but higher numbers of nested levels are not excluded. To initiate a barrier synchronisation, execution units in the tiles 4 of the processing units 2 execute SYNC instructions. The operand in the SYNC instruction indicates the sync group. If the operand of the SYNC instruction is set to the lower hierarchical level of external sync group (SYNC group_1), then the above-described sync and aggregation operations are performed in relation to the tiles 4 on the chips 2 in only the same lower-level external sync group as the tile on which the SYNC was executed. If, on the other hand, the operand of the SYNC instruction is set to the higher hierarchical level of external sync group (SYNC group_2), then the above-described sync and aggregation operations are automatically performed in relation to all the tiles 4 on all the chips 2 in the same higher-level external sync group as the tile on which the SYNC was executed.

Note that in other embodiments, the sync groups that can be specified by the mode of the SYNC instruction are not limited to being hierarchical in nature. In general, a SYNC instruction may be provided with modes corresponding to any kind of grouping. For instance, the modes may enable selection from amongst only non-hierarchical groups, or a mixture of hierarchical groupings and one or more non-hierarchical groups (where at least one group is not entirely nested within another). This advantageously enables the flexibility for the programmer or compiler, with minimal code density, to select between different layouts of internally-synchronous groups that are asynchronous with respect to one another.

In addition to an external barrier synchronisation providing for exchange between processing units 2, an external barrier synchronisation may be performed for exchanging data between the processing unit 2 and a host system. Such data may comprise application data provided by the host system for processing by the processing unit 2. The data may comprise results of processing by the processing unit 2 that are provided to the host system. This type of barrier synchronisation is referred to as a barrier synchronisation with host involvement.

Figure 6:
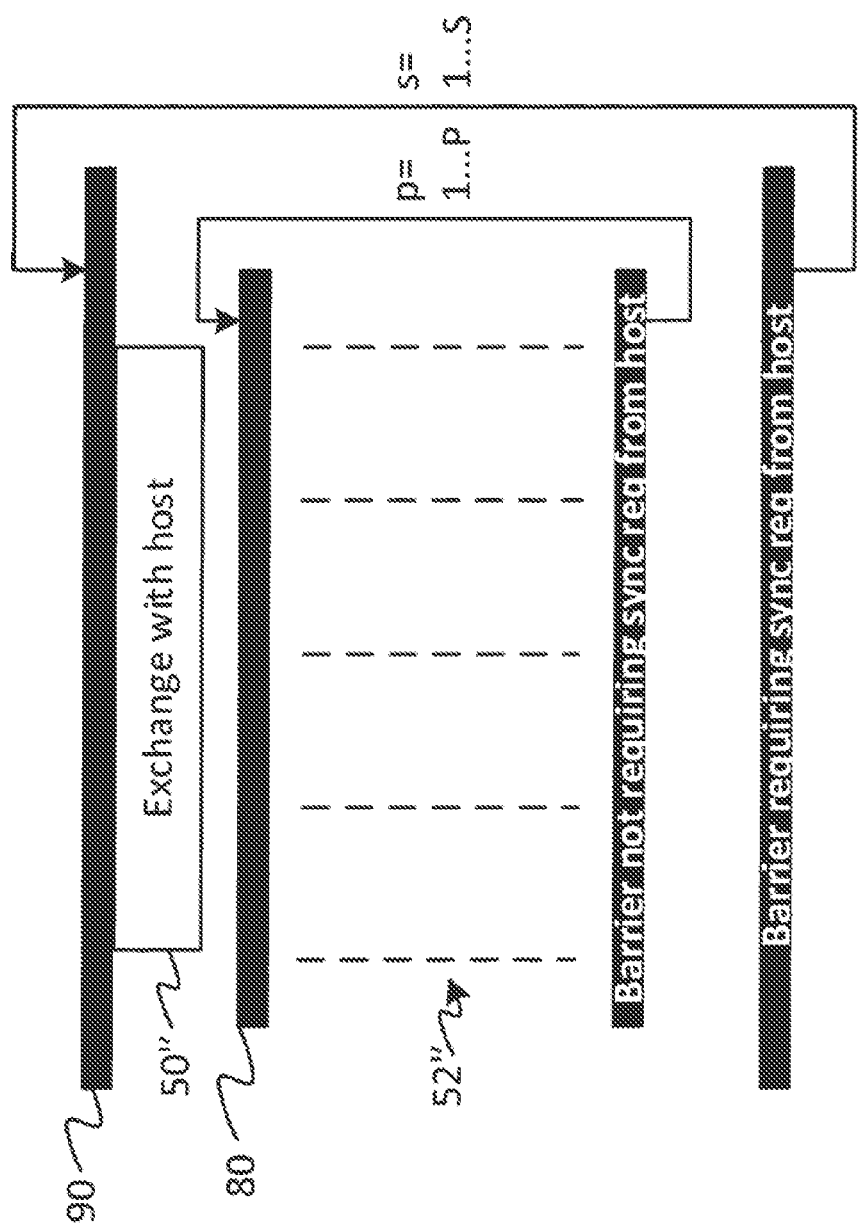
FIG. 6 schematically illustrates a program flow involving a data exchange with a host system.

The relationship between barrier synchronisations with host involvement and other barrier synchronisations is illustrated in FIG. 6. This Figure illustrates the barrier synchronisations participated in by an example processing unit 2. The processing unit 2 is allowed to participate in a number P of barrier synchronisations 80, before a barrier 90 at which host involvement is required is imposed. The P barrier synchronisations require sync requests from all the (non-abstaining) tiles 4 in the relevant sync group. The subsequent barrier synchronisation 90 requires sync requests from all the (non-abstaining) tiles 4 in the processing unit 2 and that the host has previously indicated permission to pass the particular barrier. After the barrier 90, an exchange 50" may be performed between external memory and one or more of the tiles 4 of the processing unit 2, e.g. for one or more of the tiles 4 to load workload data for processing and store computation results in the external memory. The external memory is accessible to a processor of the host. The external memory may be a memory which is part of the host itself or may be a memory external to the host, e.g. a gateway memory, that is accessible to the host and which is used to transfer data to and from the host. An example of the use of such a gateway memory is described in U.S. application Ser. No. 16/235,109, which is incorporated by reference.

The processing unit 2 is therefore configured to function as an accelerator subsystem for the host by processing certain workloads provided to it by the host via the external memory and returning the results of said processing to the host via the external memory. Certain variables that are processed by the subsystem and output by the subsystem may take the form of tensors. This is particularly so in machine learning applications, where tensors may be used for performing convolutions in convolutional neural networks or for providing a set of gradients for updating the weights of a neural network in data parallel training.

Embodiments of the application provide for the re-arrangement in memory of the elements of tensors when those tensors are transferred from a host memory to an external memory for transfer to the subsystem. The re-arrangement of elements of the tensors may be used to optimise the transfer to the subsystem of the tensors and their processing by the subsystem. Likewise, when the subsystem produces results including a tensor, those tensor results, which are transferred to the external memory by the subsystem, are re-arranged by the host for storage in host memory. This may be used to provide the tensors in a logical arrangement interpretable by a user.

Figure 7:
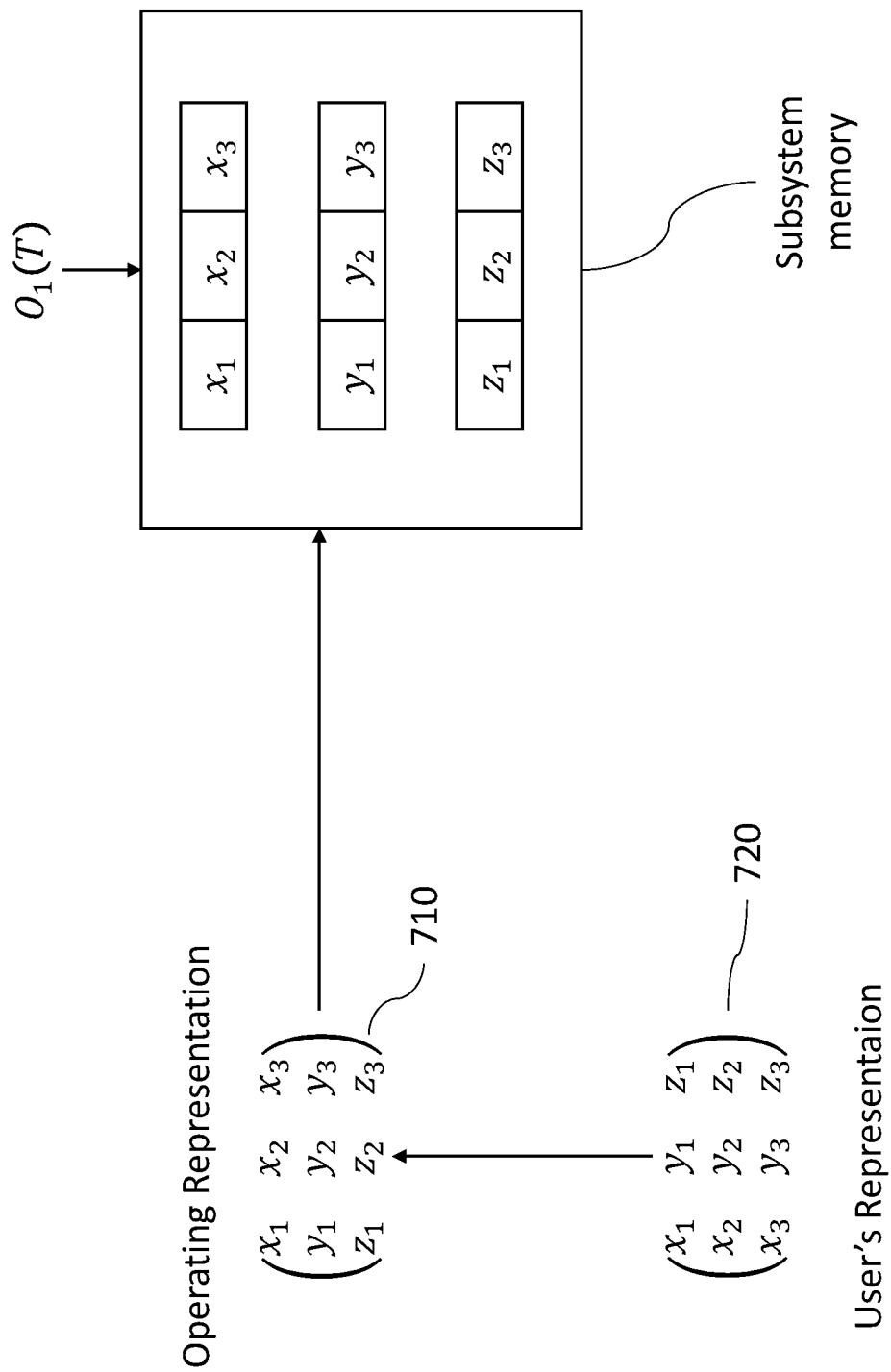
FIG. 7 illustrates an example of different representations of tensor data.

Reference is made to FIG. 7, which illustrates a principle underlying the disclosure. A certain operation is to be performed by the subsystem on a tensor of data in subsystem memory. This operation is shown represented by $O_1(T)$ in FIG. 7. Different operations may be performed on the tensor of data, with the different operations having different optimal layouts in memory of the accelerator subsystem. Each of the elements of the tensor shown in FIG. 7 may be a floating point number.

For example, suppose that the operation represented by $O_1(T)$ is an operation to perform reductions of certain groups of elements of the tensor. The tensor, which has elements $\{x_1, x_2, x_3, y_1, y_2, y_3, z_1, z_2, z_3\}$, may be subject to a set of reduction operations performed such that the elements $\{x_1, x_2, x_3\}$ are reduced together, the elements $\{y_1, y_2, y_3\}$ are reduced together, and the $\{z_1, z_2, z_3\}$ are reduced together. In this case, an optimal arrangement in subsystem memory is one in which the elements that are to be reduced together are arranged physically contiguously with one another in the memory of the subsystem. With the elements arranged in this way, it is efficient for the one or more processors of the subsystem to perform operations on the tensor so as to reduce the elements of the tensor. FIG. 7 shows a representation 710 for the tensor that indicates a layout that is optimal given the set of reduction operations to be performed on elements of the tensor. This representation 710 is referred to as the operating representation 710. The layout in memory that corresponds to the representation 710 is such that each of the sets of elements arranged along the innermost dimension of the tensor (which is visually shown as a set of rows in the example representation 710) are to be arranged contiguously to one another in the subsystem memory. The different rows may or may not be arranged contiguously to one another. In the manner to be described, the host system is configured to provide the tensor to an external memory accessible to the subsystem in the layout indicated by the operating representation 710. By doing so, the time required for the transfer of the tensor to the subsystem and the time required for processing by the subsystem may be reduced.

In addition to the operating representation 710 indicating the layout to be used for the external memory and subsystem, a further representation 720 can be defined. This representation 720 is referred to herein as the user's representation 720. The user's representation 720 is indicative of a layout in memory that is known to the user who provides the data that is used for storage of the tensor in the host memory. As with the operating representation 710, the elements arranged along the innermost dimension in the user's representation 720—e.g. $\{x_1, y_1, z_1\}$—are arranged contiguously in memory. The user's representation 720 may be a logical representation that is intuitively understandable to a human, but is not optimised for the transfer to the subsystem and the processing to be performed by the subsystem. The example of the user's representation 720 shown in FIG. 7 is the transpose of the tensor in the operating representation 710.

Having two different representations for the same tensor in this way allows for optimal processing of a tensor by the accelerator subsystem, whilst making it possible for a user to provide data in a different, potentially more intuitive format.

Figure 8:
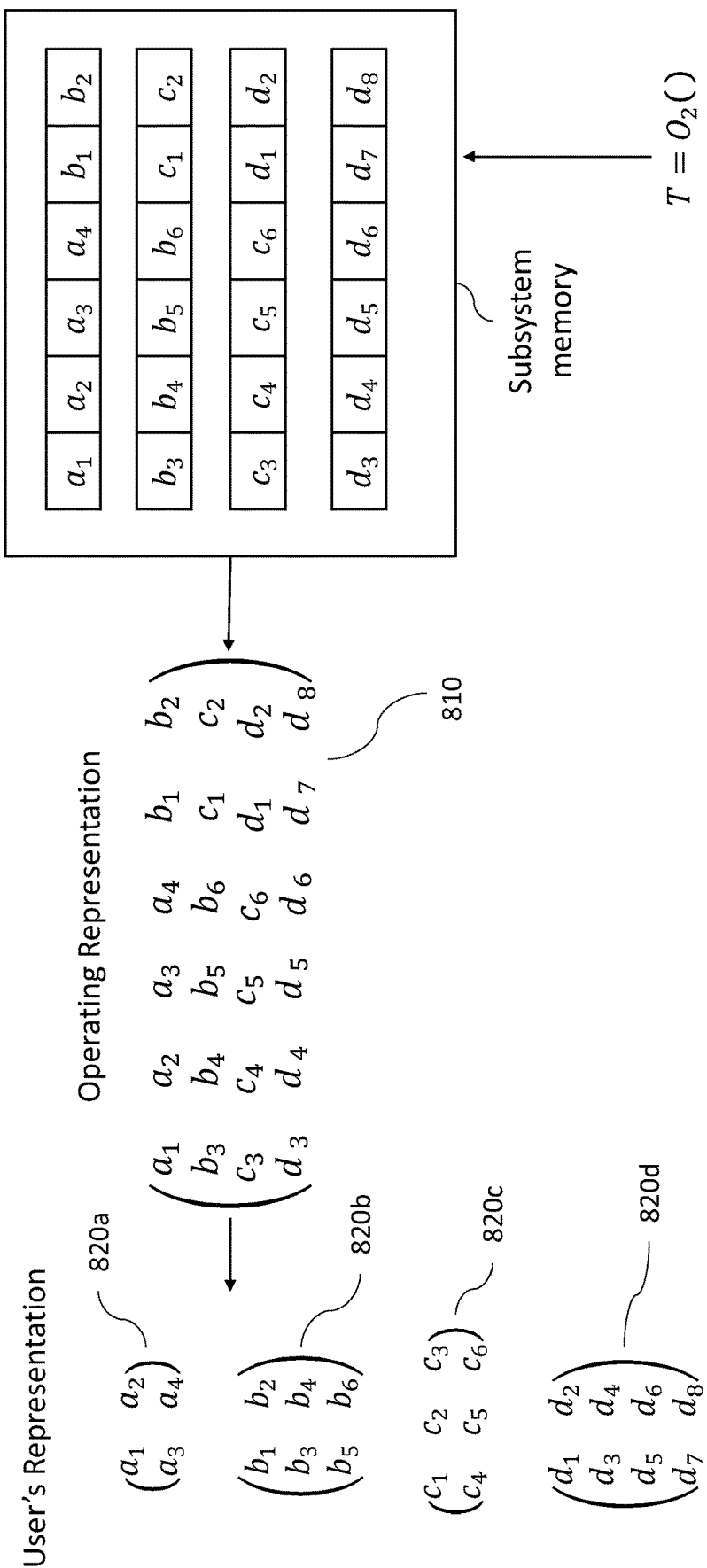
FIG. 8 illustrates a further example of different representations of tensor data.

FIG. 7 illustrates the principle of optimising the layout of a tensor that is to be processed by a subsystem. Reference is now made to FIG. 8, which illustrates the principle whereby a result output by a subsystem according to a given layout undergoes a conversion process that depends upon the operations performed by the subsystem to produce that tensor. Doing so allows the host to convert results from the subsystem's layout to a user's layout.

As in FIG. 7, each of the elements of the example tensor of FIG. 8 may be a floating point number.

As shown in FIG. 8, the subsystem when executing its assigned program, produces a tensor of results according to a given layout indicated by the operating representation 810. The operating representation 810 and the corresponding layout depends upon the operations $T=O_2(\ )$ performed by the subsystem to generate the tensor. For example, suppose that the operation represented by $O_2(\ )$ is a set of operations performed during a training process for a neural network to obtain different updated gradients for a neural network and to perform an optimisation step to update the weights of the neural network. The full set of updated weights, which is the output resulting from $O_2(\ )$, form the elements of a tensor. Different subsets of gradients may be generated by different subsystems in a data parallel processing system and used to generate a different subsets of the updated weights. For example, a first subset of gradients may be derived by a first subsystem and used to generate a first subset of the weights $\{a_1, a_2, a_3, a_4, b_1, b_2\}$. A second subset of gradients may be derived by a second subsystem and used to generate a second subset of the weights $\{b_3, b_4, b_5, b_6, c_1, c_2\}$. These subsets of the weights may be exchanged using an allgather collective such that each subsystem has the full set of weights 810 for the neural network. The use of collectives for exchanging gradients and weights between different accelerator subsystems is described in U.S. application Ser. No. 16/928,886, which is incorporated by reference.

If the weights of a subset are each received from the same subsystem, these may be stored contiguously together in the subsystem memory. For example, the weights $\{a_1, a_2, a_3, a_4, b_1, b_2\}$ may stored contiguously to one another, and the weights $\{b_3, b_4, b_5, b_6, c_1, c_2\}$ also stored contiguously to one another. The operating representation 810 indicates the complete output layout for the weights used in subsystem memory.

This output representation 810 for the tensor, however, may not match a user's representation for the tensor data. An intuitive layout may arrange the weights according to the layer of the neural network to which they correspond. In order to convert to such a layout, the host performs a conversion process to produce a user's representation of the full set of weights. As shown in FIG. 8, a user's representation of the output tensor data, which may take the form of a plurality of user's representation tensors 820a, 820b, 820c, and 820d. The first user's representation tensor 820a is produced, which comprises the weights for determining the activations for a first layer of the neural network. A second user's representation tensor 820b is produced which comprises the weights for determining the activations for a second layer of the neural network. A third user's representation tensor 820c is produced which comprises the weights for determining the activations for a third layer of the neural network. A fourth user's representation tensor 820d is produced which comprises the weights for determining a fourth layer of the neural network. Each of the user's representation tensors 820a-d are provided in a format that makes intuitive sense to a user. Each of the user's representations 820a-d has an associated layout in host memory, wherein the elements of the innermost dimensions of each of the tensors 820a-d are contiguous. Since each of the tensors 820a-d contains weights associated with a different layer of the neural network, each of the sets of weights for calculating an activation for a particular node in the neural network are arranged contiguously. For example, weights $a_1$ and $a_2$ are associated with a single node in the neural network and are arranged contiguously. Weights $a_3$ and $a_4$ are associated with a different node in the same layer and are arranged contiguously.

As will be described, the conversion process required to produce the one or more user's representation tensors 820a-d from the data output by the subsystem are determined based upon the operations $O_2(\,)$ used to produce the results.

Figure 9:
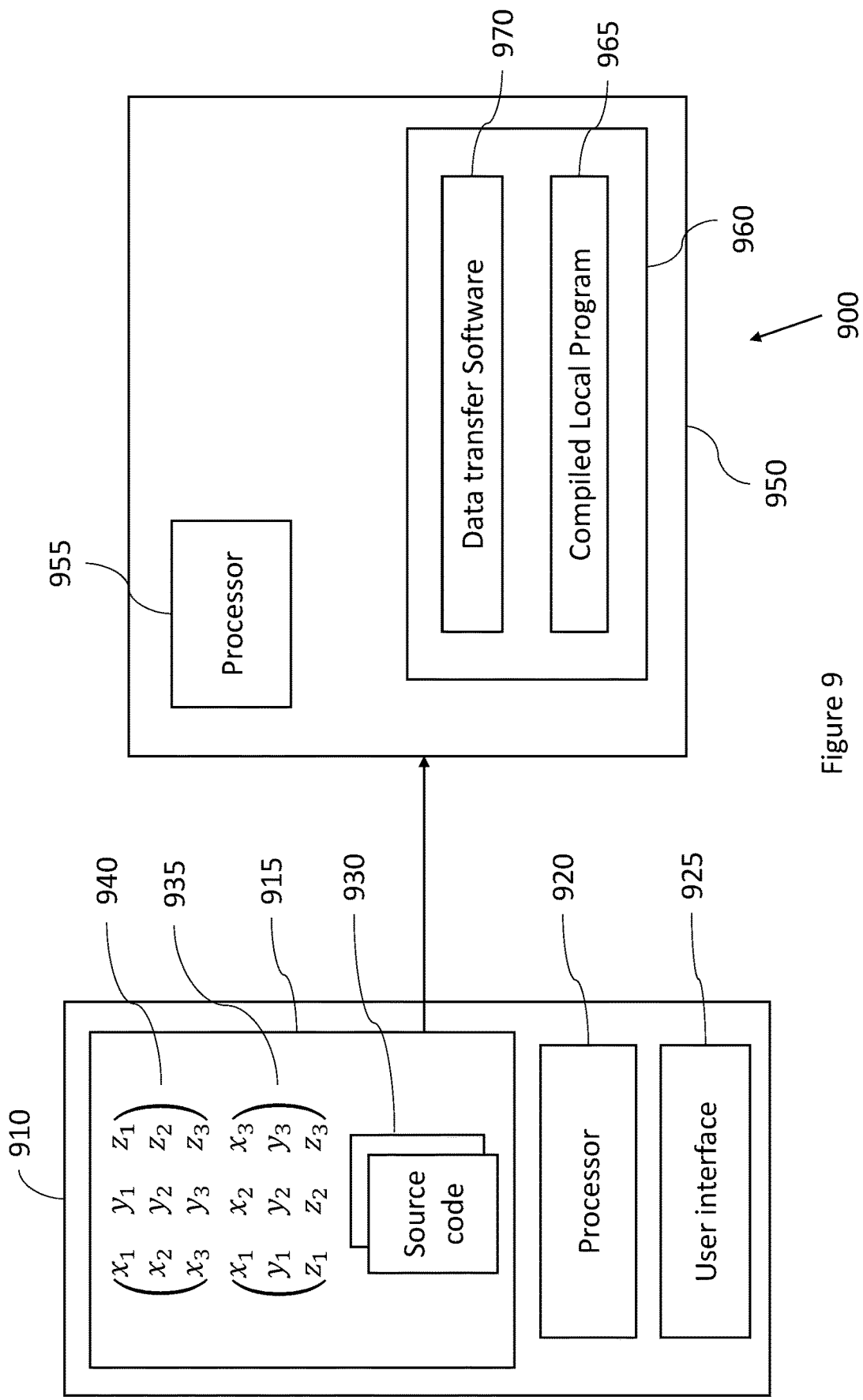
FIG. 9 illustrates a data processing system for generating data transfer instructions.

Reference is made to FIG. 9, which illustrates an example of a data processing system 900 used to implement embodiments of the application. Although the data processing system 900 is shown as including two separate devices 910, 950, in some embodiments, these devices 910, 950 may be a single device. Alternatively, more than two devices may be used to implement the steps described as being performed by the data processing system 900.

The data processing system 900 comprises a programming device 910. The programming device 910 comprises at least one processor 920, a user interface 925, and at least one memory 915. The at least one processor 920 executes instructions stored in the memory 915 to perform the functions described herein as being performed by the device 910. The user interface 925 may comprise, for example, a keyboard, mouse, and display—and is used by a user/programmer to write a set of instructions 930 for a program to execute on the accelerator subsystem. The set of instructions 930 takes the form of a set of source code, which will be compiled to produce an executable image for running on the subsystem 950.

The device 910 stores a set of programming libraries that are used to produce the set of instructions for the program for the subsystem. As part of the generation of these instructions, the programming libraries are configured to determine an arrangement of elements 935 for one or more tensors to be operated on or generated by the program running on the subsystem. This arrangement of elements 935 is the operating representation discussed above and provides an indication 935 of the layout of elements in the external memory accessible to the subsystem. The programming library determines the arrangement of elements for the operating representation 935 in dependence upon the operations indicated in the instructions for the program to performed with respect to that tensor.

For example, if the program includes an instruction for a reduction operation to be performed on different groups of elements of a tensor referenced by the program, the operating representation 935 is determined to be such that elements that are to be reduced together are indicated by the operating representation 935 to be arranged contiguously to one another in memory. In another example, if the program includes an instruction that produces elements of a tensor together, e.g. which are produced from the same reduction operation, the operating representation 935 produced by the programming library may indicate which elements of the tensor are produced together and will be stored contiguously in subsystem memory.

The programming library in addition to generating the operating representation 935 for a tensor, also generates an indication 940 of a layout of elements of a tensor when stored in the host memory. This indication 940 is the user's representation discussed above with respect to FIGS. 7 and 8. The programming library generates the user's representation 940 based on the user's specified format provided when the instructions were created or based on a different logical representation for the tensor determined by the programming library.

Although the operating representation 935 and the user's representation 940 are shown separately to the instructions 930 in FIG. 9, in some embodiments these indications 935, 940 may be inherent in the instructions themselves, which reference the tensor. It would be appreciated that although only single examples of an operating representation 935 and a user's representation 940 are shown in FIG. 9, there would preferably be multiple such representations for different tensors referenced by the instructions 930.

The programming device 910 provides the instructions 930 and the indications 935, 940 to the compilation device 950. This device 950 may be the host system or could be separate to the host system. The device 950 comprises at least one processor 955 and at least one memory 960. The processor 955 is configured to execute instructions stored in the at least one memory 960 to perform the operations described as being performed by the device 950.

The device 950 receives the instructions 930 and performs a set of compilation operations to generate the executable image 965 for execution on the subsystem. The device 950 then provides this compiled program 965 to the subsystem for execution on the subsystem.

The compiler running on the device 950 also receives the operating representation 935, and the user's representation 940 and uses theses indications 935, 940 to generate a set of data transfer instructions 970. The data transfer instructions 970 form a software interface/layer between a host memory and the external memory accessible to the subsystem and, when executed by a processor of the host, cause the memory layout of tensors transferred between the host memory and the external memory to be modified. In particular, a tensor transferred from the host memory to the external memory is stored in external memory in a layout that is suitable for transfer to and processing by the subsystem. This layout is indicated by the operating representation 935. A tensor transferred from the external memory to the host memory is stored in the host memory in user's layout, which may suitable for interpretation by the user. This layout is indicated by the user's representation 940. The data transfer instructions provide for the conversion between the two layouts.

The operating representation 935 and the user's representation 940 generated by the programming library are used by the compiler to determine the re-arrangement operations required for the tensor when transferred between host and external memory. Specifically, the indication 935 of the arrangement of the tensor when stored in external memory is used, along with the indication 940 of the user's layout, by the compiler to determine any conversion operations required to be performed by the data transfer instructions. The compiler generates the data transfer instructions including instructions for performing the required conversion operations for re-arranging the tensor when it is moved between host memory and the external memory accessible to the subsystem.

The compiler determines the conversion operations for re-arranging in this way, any of the tensors for which an operating representation and a user's representation are provided by the programming library. The generated data transfer instructions include instructions specifying these operations. The compiler also generates the program 965 with instructions, which when executed by the subsystem, cause the subsystem to store one or more tensors generated by the subsystem as part of its execution of the program 965 in the external memory in a layout in accordance with one or more operating representations for those tensors determined by the programming library.

Examples will now be described, with reference to FIGS. 10 to 12, of the conversion operations that may be performed by the data transfer instructions when executed by the host.

Figure 10:
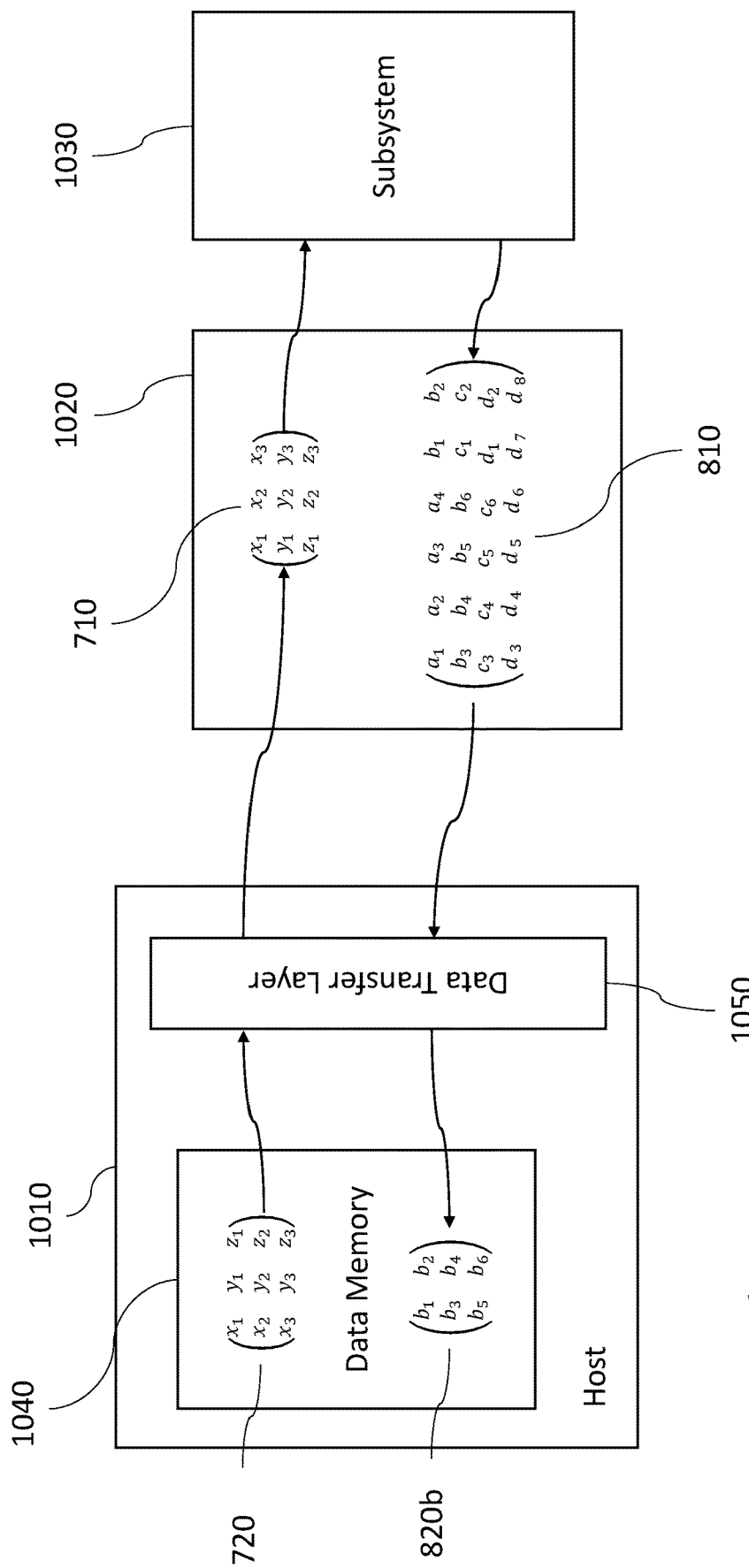
FIG. 10 illustrates an example of re-arrangement of tensors when transferred between host memory and the external memory accessible to a processing unit.

Reference is made to FIG. 10, which illustrates an example of the exchange of two tensors between the host 1010 and the subsystem 1030 via the external memory 1020. The example tensors shown in FIG. 10 are the same as the examples shown in FIGS. 7 and 8. FIG. 10 shows the transfer of a first tensor—which is illustrated by representations 720, 710—from host memory 1040 to the subsystem 1030, and the transfer of a second tensor—which is illustrated by representation 810—from subsystem memory to the host memory 1040.

The subsystem 1030 may take the form of the processing unit 2 described above with reference to FIGS. 1 to 6. Although the external memory 1020 is shown as being separate from the host system 1010, in some embodiments the memory may be part of the host system 1010. In other embodiments, the external memory 1020 may be memory of a gateway configured to interface the subsystem 1030 with the host 1010.

The host 1010 comprises a data memory 1040 for storing both workloads to be provided for processing by the subsystem 1030 and results produced and output by the subsystem 1030. The tensors stored in the data memory 1040 are arranged according to the user's representation in a logical layout understandable by the user. The tensors stored in the external memory 1020 are arranged according to the operating representation in a layout optimised for transfer to and from the subsystem 1030 and processing by the subsystem 1030. When executed by the host 1010, the data transfer instructions provide a data transfer layer 1050. The data transfer layer 1050 is configured to re-arrange the tensors to convert them between the layouts for the two memories 1020, 1040.

FIG. 10 shows a tensor stored in host memory 1040 with a first layout indicated by the user's representation 720. The data transfer layer 1050 comprises an indication of the location in the data memory 1040 of the tensor and an indication as to the re-arrangement operation to be performed to store the tensor in external memory 1020 with a second layout indicated by the operating representation 710. In this example, the program on the subsystem 1030 is compiled to perform operations on the tensor to reduce each of the groups of elements $\{x_1, x_2, x_3\}$, $\{y_1, y_2, y_3\}$, and $\{z_1, z_2, z_3\}$. Therefore, in order to optimise for the reduction operations, the data transfer layer 1050 re-arranges the elements of the tensor such that the elements in each of the groups $\{x_1, x_2, x_3\}$, $\{y_1, y_2, y_3\}$, and $\{z_1, z_2, z_3\}$ are contiguous to one another when stored in memory 1020. The subsystem 1030 then issues one or more read requests to read the tensor from the memory 1020. Since the elements between which reduction operations are to be carried out are contiguous to one another, the subsystem 1030 can efficiently load and process these.

A further tensor is shown in FIG. 10 indicated by operating representation 810. The further tensor is output by the subsystem 1030 and written to the external memory 1020. In this case, the program running on the subsystem 1030 generates the tensor by generating a subset of weights of the tensor and participating in an all-gather collective to obtain a full set of weights. Each row in the operating representation 810 of the tensor is produced by a different subsystem. Therefore, all of the elements in a particular row are arranged contiguously with one another since they are each derived by and received from the same subsystem.

In the operating representation 810 shown, each letter may be associated with a different layer of the neural network, e.g. elements $\{a_1, a_2, a_3, a_4\}$ are weights associated with one layer, weights $\{b_1, b_2, b_3, b_4, b_5, b_6\}$ are weights associated with another layer, and so on. When providing the results to the host memory 1040, the data transfer layer 1050 re-arranges the elements of the tensor to produce the user's representation tensors 820a, 820b, 820c, 820d (collectively referred to as user's representations 820). For simplicity, only one of the user's representations 820, i.e. user's representation 820b, is shown. The data transfer layer causes the tensor data to be stored in the host memory 1040 in accordance with the representations 820a-d.

If, after storing the data of user's representation tensors 820 in memory 820b, this data is subsequently required for processing, the host 1010 transfers the data to the external memory 1020. In doing so, the data transfer layer 1050 may perform a re-arrangement of the elements of each of the user's representation tensors 820 so as to layout the elements in a different physical arrangement in memory 1020 than is indicated by the representations 820a-d. The physical arrangement to be used is, as described above, determined in dependence upon the operations to be performed by the program running on the subsystem.

As described, in some embodiments, the subsystem 1030 may take the form of a multi-tile processing unit 2. In this case, a tensor of data loaded into the subsystem 2 may be distributed to different tiles 4 of the subsystem for processing. In this case, the operations that determine the layout of the tensor elements in memory 1020 include the operations for distributing the data to different tiles 4.

Figure 11:
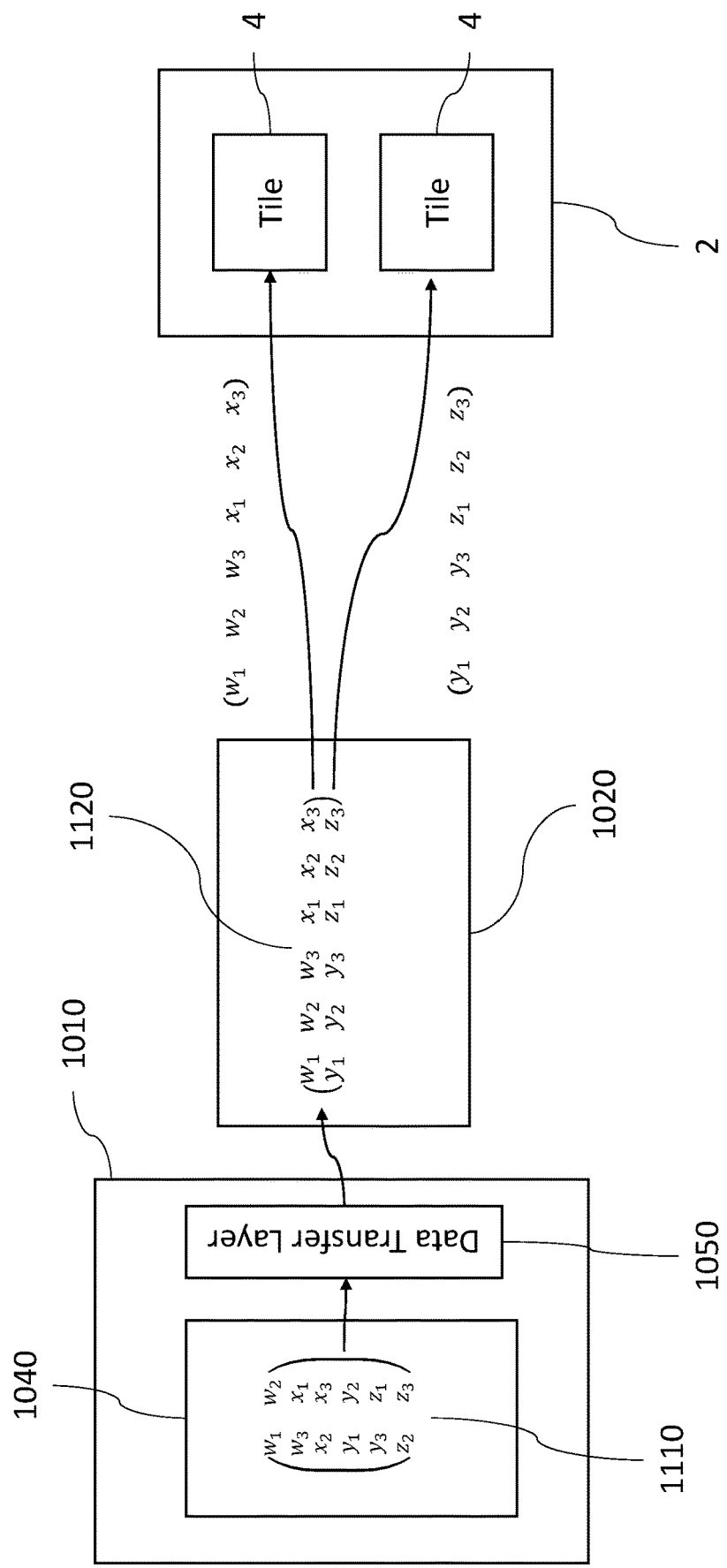
FIG. 11 illustrates an example of re-arrangement of tensors when transferred between host memory and the external memory accessible to a multi-tile processing unit.

Reference is made to FIG. 11, which illustrates how a tensor of data from the host memory 1040 may be re-arranged and laid out in external memory 1020 prior to being distributed to different tiles 4 of the processing unit. FIG. 11 shows a user's representation 1110 and an operating representation 1120 of a tensor. The operations $O_1(T)$ to be performed on the tensor by the tiles 4 of the subsystem 2 include i) distributing different slices of the tensor to different tiles 4 of the subsystem 2, and ii) reducing the elements of the tensor such that elements $\{w_1, w_2, w_3\}$ are reduced together, elements $\{x_1, x_2, x_3\}$ are reduced together, etc. As shown in FIG. 11, the data transfer layer 1050 causes the elements of tensor 1110 to be laid out in memory 1020 in an arrangement whereby both i) the elements to be reduced together are contiguous to one another, and ii) the elements to be provided to the same tile 4 on the subsystem 2 are contiguous to one another. For example, the groups of elements $\{w_1, w_2, w_3\}$ and $\{x_1, x_2, x_3\}$ are, despite not being scheduled to be reduced together by the subsystem, arranged contiguously in memory 1020. In this way, when one of the tiles 4 issues a read request to read the elements $\{w_1, w_2, w_3, x_1, x_2, x_3\}$ from memory 1020, the read operation is efficiently carried out since the relevant elements are arranged contiguously in memory 1020. The same applies for the elements $\{y_1, y_2, y_3, z_1, z_2, z_3\}$, which are also arranged contiguously and so read by the relevant tile 4 more efficiently than would be the case if they were distributed at different physical locations in memory 1020.

Figure 12:
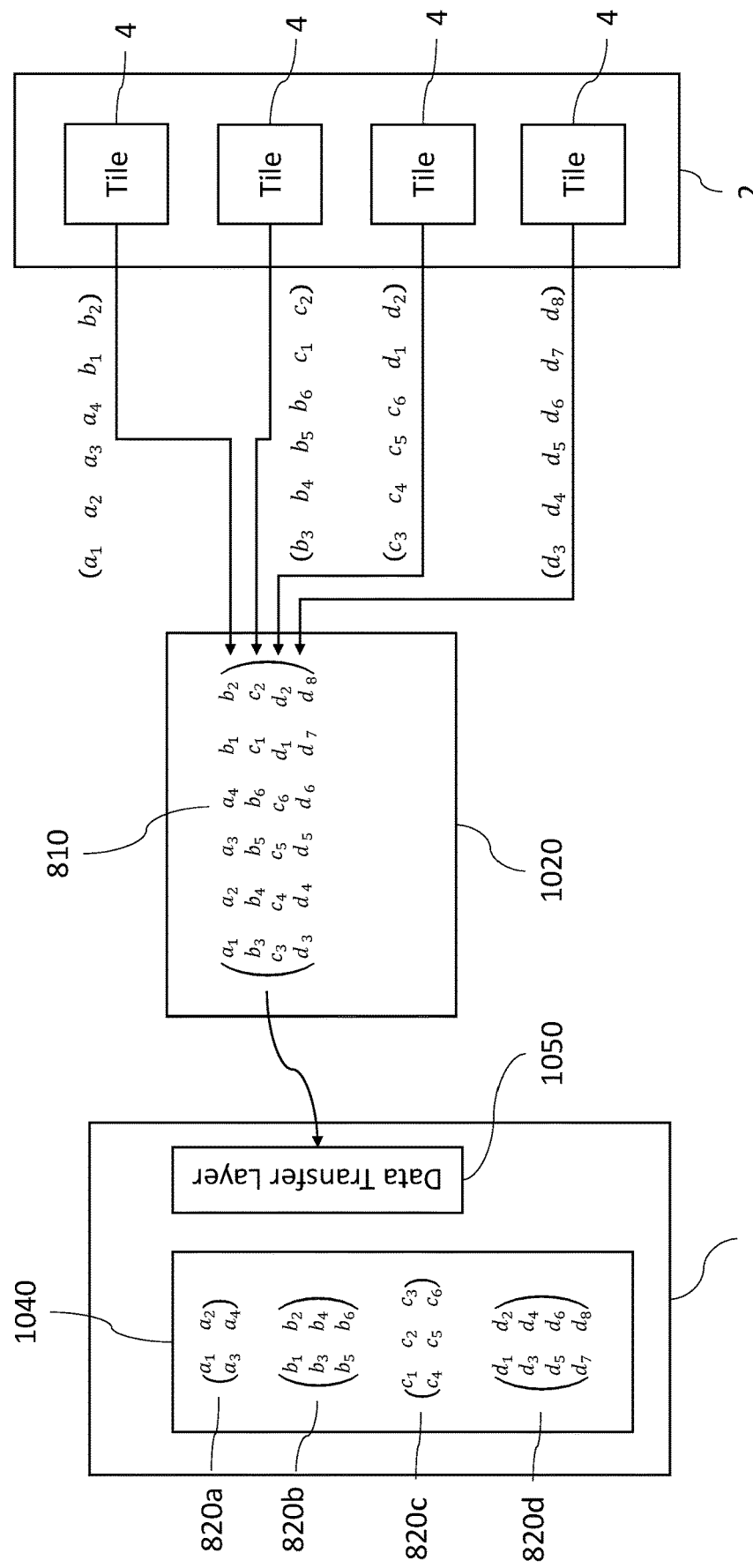
FIG. 12 illustrates a further example of re-arrangement of tensors when transferred between host memory and the external memory accessible to a multi-tile processing unit.

Reference is made to FIG. 12, which illustrates how different slices of the tensor representation 810 may be output by different tiles 4 and stored in the memory 1020. As described, different ones of the slices of the operation representation 810 may be obtained by different subsystems in a data parallel processing system. Each of the subsystems, including subsystem 2 shown in FIG. 12, share the different slices using, for example, an allgather collective. When the subsystem 2 receives the slices, each of the different slices is stored by a different tile 4 of the subsystem 2. As shown, each of the different slices output by the tiles 4 is stored contiguously in the memory 1020. The host system 1010 then reads all of the data of the tensor representation 810 from memory 1020. The data transfer layer 1050 of the host 1010 re-arranges data of the operating representation tensor 810 in accordance with the user representations 820a, 820b, 820c, and 820d and stores that data in the host memory 1040.

Figure 13:
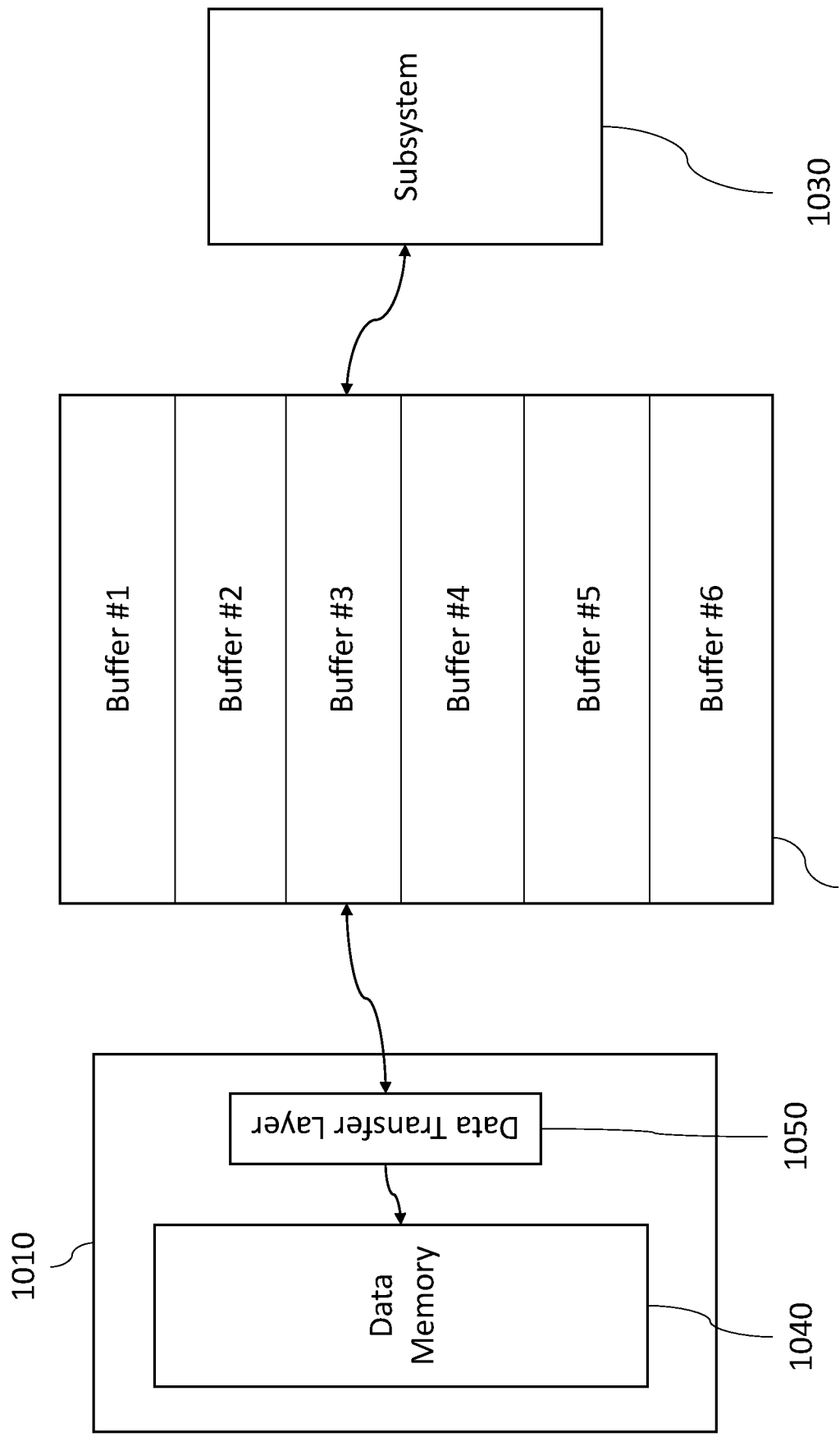
FIG. 13 illustrates an example of the transfer of data between host memory and the subsystem via an external memory comprising a plurality of buffers.

Reference is made to FIG. 13, which illustrates how the external memory 1020 may be arranged into different buffers. Each of these buffers are bidirectional and may be written to and read from by the host 1010 and may be written to and read from by the subsystem 1030. Each of the buffers in external memory 1020 is operable to store the tensor data discussed above.

The division of the external memory 1020 into different buffers has at least two advantages. Firstly, the accessing of different memory locations in a large memory is simplified. When a read or write request is dispatched to the memory 1020 by the host 1010 or by the subsystem 1030, such a read or write request may include a handle specifying the buffer to be read or written from. In addition to this handle, it is only required for the read or write request to specify an offset into the buffer. It is therefore not necessary for the host 1010 and subsystem 1030 to track an offset specified for the entire memory 1020 for each data item.

Secondly, by dividing the memory 1020 into different buffers it is possible to apply different layout optimisations for different buffers. The program that is provided to the subsystem 2 is constrained to read and write certain tensors to a certain buffer of the memory 1020. This buffer from which a tensor will be read from or written to is specified in the program, when that program is transferred to the subsystem. However, the locations within a buffer that are read from and written to may be determined dynamically by the program at runtime. These locations may vary in dependence upon the results of the processing by the subsystem 1030. By constraining the program to write to and read from certain buffers, the data transfer layer 1050 may apply different re-arrangement optimisations for different buffers. The same tensor when written to different buffers may be written with a different memory layout. Since the layout varies in dependence upon the operations to be performed with respect to the tensor, the data transfer layer 1050 is programmed to write the tensor to a selected buffer in dependence upon the operations to be performed on that tensor. For example, if the program running on the subsystem 1030 is to perform a set of reduction operations on groups of elements that are arranged along a certain dimension of the user's representation of a tensor, the data transfer layer 1050 is generated with an indication that the tensor is to be written to buffer #1 with the elements to be reduced being contiguous to one another. On the other hand, if the program running on the subsystem 1030 is to perform a set of reduction operations on groups of four elements extracted from different locations in the user's representation of the tensor, the data transfer layer 1050 is generated with an indication that the tensor is to be written to buffer #2 with the groups of four elements arranged contiguous to one another.

Figure 14:
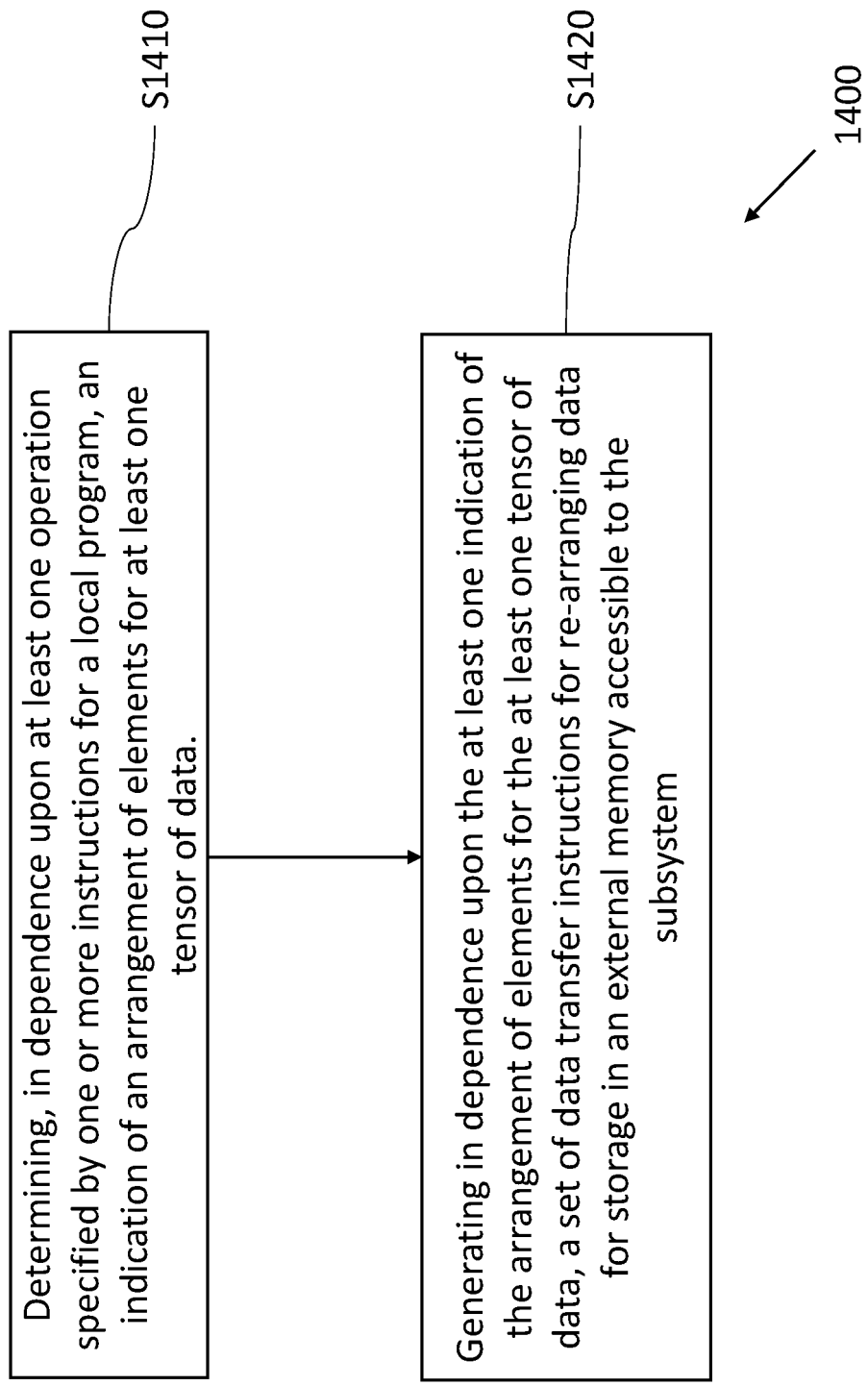
FIG. 14 illustrates an example method of generating data transfer instructions for transferring data to external memory from host memory.

Reference is made to FIG. 14, which illustrates a method 1400 according to embodiments of the application.

At S1410, the data processing system determines, in dependence upon at least one operation specified by one or more instructions for a local program, at least one indication of an arrangement of elements for at least one tensor of data. The at least one indication may comprise the operating representation and/or the user's representation discussed above.

At S1420, the data processing system generates in dependence upon the at least one indication of the arrangement of elements for the at least one tensor of data, a set of data transfer instructions for re-arranging data for storage in an external memory accessible to the subsystem. When these data transfer instructions are executed by the host, they cause the elements of the at least one tensor of data to be stored in the external memory in a modified layout according to the operating representation.

Figure 15:
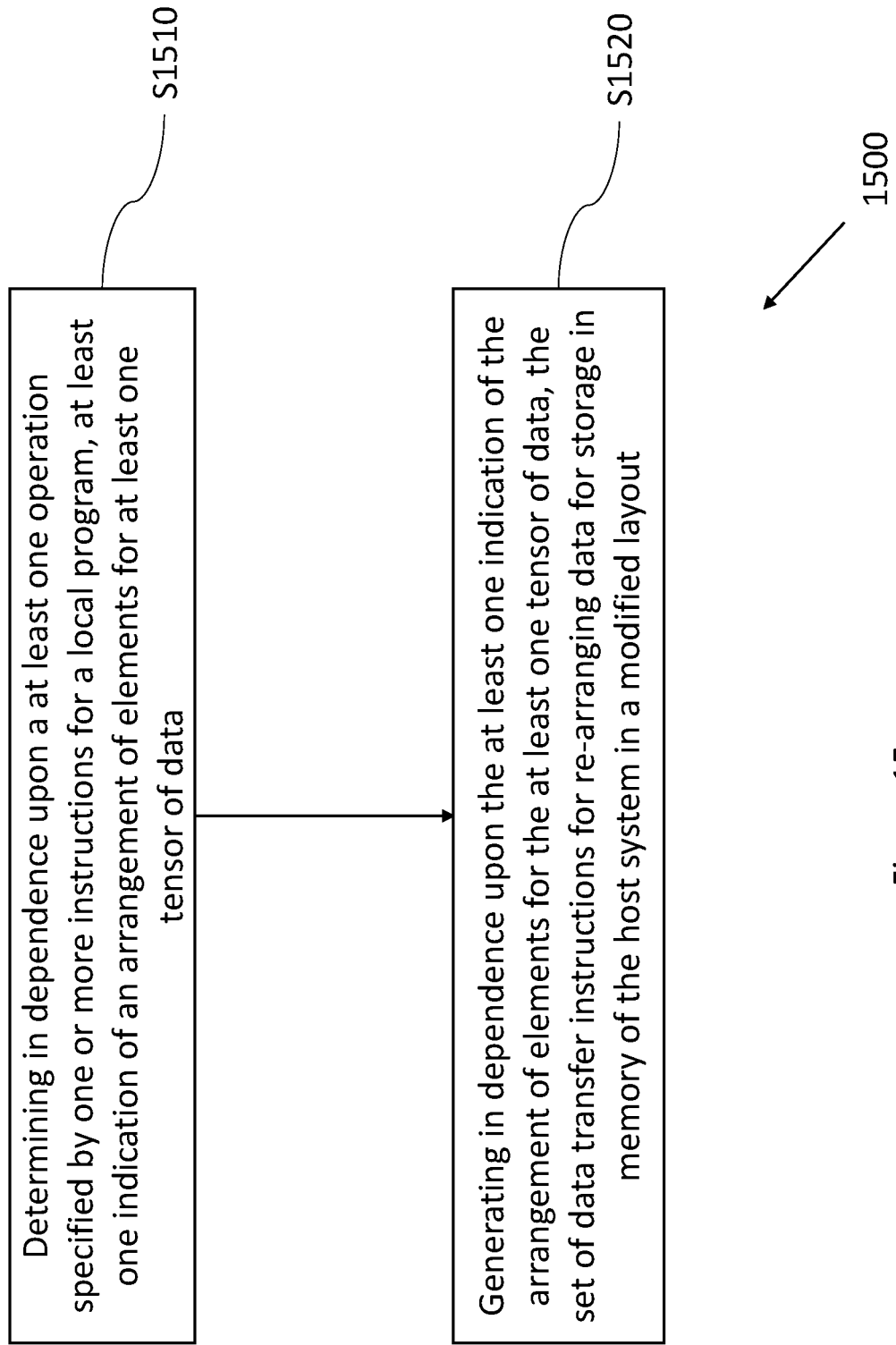
FIG. 15 illustrates an example method of generating data transfer instructions for transferring data to host memory from external memory.

Reference is made to FIG. 15, which illustrates a method 1500 according to embodiments of the application.

At S1510, the data processing system determines, in dependence upon at least one operation specified by one or more instructions for a local program, an indication of an arrangement of elements for at least one tensor of data. The at least one indication may comprise the operating representation and/or the user's representation discussed above.

At S1520, the data processing system generates in dependence upon the at least one indication of the arrangement of elements for the at least one tensor of data, the set of data transfer instructions for re-arranging data for storage in memory of the host system in a modified layout. When these data transfer instructions are executed by the host, they cause the elements of the at least one tensor to be stored in the host memory in a modified layout according to the user's representation.

It will be appreciated that the above embodiments have been described by way of example only. Some embodiments may include a method for providing a set of data transfer instructions, the method including: determining in dependence upon a at least one operation specified by one or more instructions for a program, at least one indication of an arrangement of elements for at least one tensor of data, the one or more instructions specifying the at least one operation as being performed with respect to the at least one tensor, the program being for execution on a subsystem for acting as a work accelerator to a host system; and generating in dependence upon the at least one indication of the arrangement of elements for the at least one tensor of data, the set of data transfer instructions for re-arranging data for storage in memory of the host system in a modified layout, wherein the program is configured to, when executed by at least one processor of the subsystem, cause at least one write request to be issued to the external memory to write to the external memory, data including the at least one tensor, wherein the data transfer instructions are configured to, when executed on at least one processor of the host system: cause the data including the at least one tensor to be read from the external memory; and cause the at least one tensor read from the external memory to be stored in the memory of the host system in the modified layout.

Further, some embodiments include a non-transitory computer readable storage medium storing instructions which, when executed by at least one processor, cause a method to be carried out, the method including: determining, in dependence upon at least one operation specified by one or more instructions for a program, at least one indication of an arrangement of elements for at least one tensor of data, the one or more instructions specifying the at least one operation as being performed with respect to the at least one tensor, the program being for execution on a subsystem for acting as work accelerator to a host system; generating in dependence upon the at least one indication of the arrangement of elements for the at least one tensor of data, a set of data transfer instructions for re-arranging data for storage in an external memory accessible to the subsystem, wherein the data transfer instructions are configured to, when executed on at least one processor of the host system: cause data to be read from a memory of the host system, said data including the at least one tensor; and cause the elements of the at least one tensor read from the memory of the host system to be stored in the external memory in a modified layout dependent upon the at least one indication of the arrangement of elements, wherein the program is configured to, when executed by at least one processor of the subsystem, cause a read request to be issued to the external memory to read the elements of the at least one tensor in the modified layout from the external memory.

Moreover, some embodiments include a non-transitory computer readable storage medium storing instructions which, when executed by at least one processor, cause a method to be carried out, the method including: determining in dependence upon a at least one operation specified by one or more instructions for a program, at least one indication of an arrangement of elements for at least one tensor of data, the one or more instructions specifying the at least one operation as being performed with respect to the at least one tensor, the program being for execution on a subsystem for acting as a work accelerator to a host system; and generating in dependence upon the at least one indication of the arrangement of elements for the at least one tensor of data, the set of data transfer instructions for re-arranging data for storage in memory of the host system in a modified layout, wherein the program is configured to, when executed by at least one processor of the subsystem, cause at least one write request to be issued to the external memory to write to the external memory, data including the at least one tensor, wherein the data transfer instructions are configured to, when executed on at least one processor of the host system: cause the data including the at least one tensor to be read from the external memory; and cause the at least one tensor read from the external memory to be stored in the memory of the host system in the modified layout.

The invention claimed is:

1. A data processing system comprising at least one processor and at least one memory storing computer readable instructions, wherein the at least one processor is configured to execute the computer readable instructions to:
   determine, in dependence upon one or more instructions specifying at least one operation in a program, at least one indication of an arrangement of elements for at least one tensor of data, the one or more instructions specifying the at least one operation as being performed with respect to the at least one tensor, the program being for execution on a subsystem that is different to the data processing system and which is configured to act as work accelerator to a host system;
   generate in dependence upon the at least one indication of the arrangement of elements for the at least one tensor of data, a set of data transfer instructions for re-arranging data for storage in an external memory accessible to the subsystem, wherein the data transfer instructions are configured to, when executed on at least one processor of the host system:
      cause data to be read from a memory of the host system, said data including the at least one tensor; and
      cause the elements of the at least one tensor read from the memory of the host system to be stored in the external memory in a modified layout dependent upon the at least one indication of the arrangement of elements,
   wherein the program is configured to, when executed by at least one processor of the subsystem, cause a read request to be issued to the external memory to read the elements of the at least one tensor in the modified layout from the external memory.

2. The data processing system of claim 1, wherein the at least one indication of an arrangement of elements for the at least one tensor of data comprises:
   an indication of a layout for the at least one tensor when stored in the memory of the host system; and
   an indication of the modified layout.

3. The data processing system of claim 1, wherein the at least one operation comprises a plurality of operations, wherein each of the plurality of operations are specified in the one or more instructions to be performed with respect to a different subset of elements of the at least one tensor,
   wherein the modified layout is such that, for each of the subsets of elements, the elements of the respective subset are arranged contiguously in the external memory.

4. The data processing system of claim 3, wherein each of at least some of the plurality of operations comprises a reduction operation,
   wherein the modified layout is such that elements of the at least one tensor to be reduced together are arranged contiguously to one another in the external memory.

5. The data processing system of claim 3, wherein the subsystem comprises a processing unit comprising a plurality of processors,
   wherein each of at least some of the plurality of operations comprises a different one of the processors reading a different one of the subsets of elements from the external memory,
   wherein the modified layout is such that elements of the at least one tensor to be delivered to a same one of the processors are arranged contiguously to one another in the external memory.

6. The data processing system of claim 1, wherein the external memory comprises a plurality of buffers, wherein the at least one operation specified by the one or more instructions comprises reading the elements of the at least one tensor in the modified layout from one of the plurality of buffers specified by the one or more instructions, wherein the determining the indication of the arrangement of elements comprises determining the arrangement of elements in dependence upon which of the plurality of buffers the elements of the at least one tensor is to be read from as specified by the one or more instructions.

7. The data processing system of claim 1, wherein the external memory is part of the host system.

8. The data processing system of claim 1, wherein the at least one operation comprises:

generating from the elements of the at least one tensor, at least one result tensor; and causing the at least one result tensor to be stored in the external memory according to a layout used for storing the at least one result tensor in the subsystem memory.

9. A data processing system comprising at least one processor and at least one memory storing computer readable instructions, wherein the at least one processor is configured to execute the computer readable instructions to:

determine in dependence upon one or more instructions specifying at least one operation in a program, at least one indication of an arrangement of elements for at least one tensor of data, the one or more instructions specifying the at least one operation as being performed with respect to the at least one tensor, the program being for execution on a subsystem that is different to the data processing system and which is configured to act as a work accelerator to a host system;

generate in dependence upon the at least one indication of the arrangement of elements for the at least one tensor of data, a set of data transfer instructions for re-arranging data for storage in memory of the host system in a modified layout, wherein the program is configured to, when executed by at least one processor of the subsystem, cause at least one write request to be issued to an external memory to write to the external memory, data including the at least one tensor, wherein the data transfer instructions are configured to, when executed on at least one processor of the host system:

cause the data including the at least one tensor to be read from the external memory; and cause the elements of the at least one tensor read from the external memory to be re-arranged so as to be provided in the modified layout and stored in the memory of the host system in the modified layout.

10. The data processing system of claim 9, wherein the at least one indication of an arrangement of elements for the at least one tensor of data comprises:

an indication of a layout for the at least one tensor when stored in the external memory; and an indication of the modified layout.

11. The data processing system of claim 9, wherein the at least one operation comprises a plurality of operations, wherein each of the plurality of operations are specified in the one or more instructions to be performed with respect to a different subset of elements of the at least one tensor, wherein the writing to the external memory comprises for each of the subsets of elements, writing the respective subset such that the elements of the respective subset are arranged contiguously in the external memory.

12. The data processing system of claim 11, wherein each of at least some of the plurality of operations comprises receiving the respective subset of elements of the at least one tensor from a different one of a plurality of further subsystems.

13. The data processing system of claim 11, wherein the subsystem comprises a processing unit comprising a plurality of processors, wherein the at least one write request comprises a plurality of write requests, wherein each of at least some of the plurality of operations comprises a different one of the processors issuing one or more of the write requests to write one of the subsets of elements to the external memory.

14. The data processing system of claim 9, wherein the at least one operation specified by the one or more instructions comprises one or more collective operations for generating the elements of the at least one tensor, wherein each of the elements is associated with a weight of a neural network, wherein the generating the data transfer instructions comprises determining the modified layout such that ones of the weights for determining an activation for a same node of the neural network are arranged contiguously to one another in the memory of the host system.

15. The data processing system of claim 9, wherein the external memory comprises a plurality of buffers, wherein the at least one operation specified by the one or more instructions comprises dispatching the at least one write request to write to the one of the plurality of buffers, data including at least one tensor, wherein the data transfer instructions are configured to, when executed on at least one processor of the host system, cause the data including the at least one tensor to be read from the one of the plurality of buffers, wherein the generating the data transfer instructions comprises determining the modified layout in dependence upon which of the plurality of buffers, the at least one tensor is written to and read from.

16. The data processing system of claim 9, wherein the at least one processor is configured to execute the computer readable instructions to:

compile the program using the one or more instructions for the program, the compilation comprising: providing the compiled program with at least one instruction which, when executed by at least one processor of the subsystem, causes the subsystem to write the data of the at least one tensor to the external memory in the layout for the at least one tensor when stored in the external memory.

17. The data processing system of claim 16, wherein the layout for the at least one tensor when stored in the external memory corresponds to a layout for the at least one tensor when stored in at least one memory of the subsystem.

18. A method implemented in a data processing system, the method comprising:

determining, based upon one or more instructions specifying at least one operation in a program for a subsystem, an indication of an arrangement of elements for a tensor of data, the one or more instructions specifying the operations as being performed with respect to the tensor; and generating, based at least in part on the indication of the arrangement of elements, a set of data transfer instructions for re-arranging data for storage in memory of a host system in a modified layout, wherein the program is configured to, when executed by the subsystem, which is different to the data processing system and which acts as a work accelerator to the host system, cause one or more write requests to be issued to an external memory to write the tensor to the external memory, wherein the data transfer instructions are configured to, when executed by the host system:

cause the tensor to be read from the external memory; and cause the elements of the tensor to be re-arranged so as to be provided in the modified layout and stored in the memory of the host system in the modified layout.

19. The method of claim 18, wherein the indication of the arrangement of elements comprises:

an indication of a layout for the tensor when stored in the external memory; and an indication of the modified layout.

20. The method of claim 18, wherein the elements are associated with a plurality of weights of a neural network, and wherein generating the data transfer instructions comprises determining the modified layout such that a set of the weights associated with a same layer in the neural network are arranged contiguously in the memory of the host system.

21. The method of claim 18, wherein the external memory comprises a plurality of buffers, wherein the plurality of operations comprises dispatching the one or more write requests to write the tensor to the plurality of buffers, wherein the data transfer instructions are configured to, when executed by the host system, cause the tensor to be read from the plurality of buffers.

22. A non-transitory computer readable storage medium storing instructions which, when executed by at least one processor of a data processing system, cause a method to be carried out, the method comprising:

determining, in dependence upon one or more instructions specifying at least one operation in a program for a subsystem, an indication of an arrangement of elements for a tensor of data, the one or more instructions specifying the operations as being performed with respect to the tensor;

generating in dependence upon the indication of the arrangement of elements, a set of data transfer instructions for re-arranging data for storage in memory of a host system in a modified layout, wherein the program is configured to, when executed by the subsystem, which is different to the data processing system and which acts as a work accelerator to the host system, cause one or more write requests to be issued to an external memory to write the tensor to the external memory, wherein the data transfer instructions are configured to, when executed by the host system:

cause the tensor to be read from the external memory; and cause the elements of the tensor to be re-arranged so as to be provided in the modified layout and stored in the memory of the host system in the modified layout.

23. The non-transitory computer readable storage medium of claim 22, wherein the indication of the arrangement of elements comprises:

an indication of a layout for the tensor when stored in the external memory; and an indication of the modified layout.

24. The non-transitory computer readable storage medium of claim 22, wherein each operation of the plurality of operations is specified in the one or more instructions to be performed with respect to a different subset of elements of the tensor, wherein writing the tensor to the external memory comprises for each of the subsets of elements, arranging the subsets of elements contiguously in the external memory.

25. The non-transitory computer readable storage medium of claim 24, wherein some of the plurality of operations comprise receiving the respective subset of elements of the tensor from a different one of a plurality of further work accelerators.

26. The non-transitory computer readable storage medium of claim 24, wherein the work accelerator comprises a plurality of processors, wherein the one or more write requests comprises a plurality of write requests, wherein some of the plurality of operations comprise the processors issuing the plurality of write requests to write the subsets of elements to the external memory.

27. The non-transitory computer readable storage medium of claim 22, wherein the plurality of operations comprises collective operations for generating the elements of the tensor, wherein the elements are associated with a plurality of weights of a neural network, and wherein generating the data transfer instructions comprises determining the modified layout such ones of the weights associated with a same layer of the neural network are arranged contiguously in the memory of the host system.

28. The non-transitory computer readable storage medium of claim 22, wherein the method further comprises:

compile the program using the one or more instructions for the program, the compilation including: providing the compiled program with at least one instruction which, when executed by the work accelerator, causes the work accelerator to write the tensor to the external memory in the layout for the tensor when stored in the external memory.

29. The non-transitory computer readable storage medium of claim 28, wherein the layout for the tensor when stored in the external memory corresponds to a layout for the tensor when stored in a memory of the work accelerator.

* * * * *